United States Patent
Maeomichi et al.

(10) Patent No.: US 12,373,454 B2
(45) Date of Patent: Jul. 29, 2025

(54) DATA PROCESSING SYSTEM, METHOD, AND PROGRAM

(71) Applicant: NIPPON TELEGRAPH AND TELEPHONE CORPORATION, Tokyo (JP)

(72) Inventors: Hiroyuki Maeomichi, Musashino (JP); Ikuo Yamasaki, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 302 days.

(21) Appl. No.: 17/275,550

(22) PCT Filed: Jun. 4, 2019

(86) PCT No.: PCT/JP2019/022190
§ 371 (c)(1),
(2) Date: Mar. 11, 2021

(87) PCT Pub. No.: WO2020/054147
PCT Pub. Date: Mar. 19, 2020

(65) Prior Publication Data
US 2022/0107954 A1    Apr. 7, 2022

(30) Foreign Application Priority Data
Sep. 14, 2018   (JP) .................. 2018-172086

(51) Int. Cl.
*G06F 16/25*       (2019.01)
*G06F 16/2457*    (2019.01)
(Continued)

(52) U.S. Cl.
CPC ........ *G06F 16/252* (2019.01); *G06F 16/2457* (2019.01); *G06F 16/284* (2019.01); *H04W 24/02* (2013.01)

(58) Field of Classification Search
None
See application file for complete search history.

(56) References Cited

U.S. PATENT DOCUMENTS

| | | | | |
|---|---|---|---|---|
| 6,721,795 B1* | 4/2004 | Eldreth | .................. | G06Q 30/02 709/236 |
| 2003/0217071 A1* | 11/2003 | Kobayashi | .............. | G06F 40/58 707/999.102 |

(Continued)

OTHER PUBLICATIONS

OneM2M Web Site, http://www.onem2m.org/; 2017.
(Continued)

*Primary Examiner* — Augustine K. Obisesan
(74) *Attorney, Agent, or Firm* — Harness, Dickey & Pierce, P.L.C.

(57) ABSTRACT

A data processing system according to an embodiment is a data processing system in which one or more application programs and one or more devices are connected to a database via a network, the system including a processor configured to: perform acceptance processing for accepting a request from the application programs or data from the devices; have a plurality of types of perpetuation functions of performing processing in accordance with a type of the request or the data and perpetually storing a processing result in the database, perform, using the perpetuation functions, processing corresponding to the type of the accepted request or data, and perform perpetuation processing for perpetually storing the processing result in the database; and perform switching processing for switching a destination at which the accepted request or data is processed to one of the plurality of types of perpetuation functions, based on the type of the accepted request or data.

10 Claims, 15 Drawing Sheets

(51) Int. Cl.
*G06F 16/28* (2019.01)
*H04W 24/02* (2009.01)

(56) References Cited

U.S. PATENT DOCUMENTS

| | | | | |
|---|---|---|---|---|
| 2007/0004451 | A1* | 1/2007 | C. Anderson | G06F 1/1626 455/556.1 |
| 2007/0180454 | A1* | 8/2007 | Fujimoto | G06F 9/45558 719/320 |
| 2008/0205507 | A1* | 8/2008 | Komiya | H04N 21/44004 709/201 |
| 2008/0247004 | A1* | 10/2008 | Yeung | H04N 1/00244 358/486 |
| 2011/0279853 | A1* | 11/2011 | Yamada | G06F 3/1203 358/1.15 |
| 2013/0124796 | A1* | 5/2013 | Luo | G06F 3/0649 711/108 |
| 2014/0285838 | A1* | 9/2014 | Bettineski | H04N 1/00363 358/1.15 |
| 2015/0358384 | A1* | 12/2015 | Wang | G06F 16/40 709/219 |
| 2016/0306598 | A1* | 10/2016 | Ohishi | H04N 1/00222 |

OTHER PUBLICATIONS

OneM2M Specification TS-0001 version 2.10.0; Aug. 30, 2016.
OneM2M Specification TS-0004 version 2.7.1; Aug. 30, 2016.
Latest Trend of Horizontally-integrated IoT Platform Standard Specification oneM2M, NTT Gizyutu Journal (NTT Technology Journal), Feb. 2018, pp. 69-72, http://www.ntt.co.jp/journal/1802/files/JN20180269.pdf.
ARIB-TTC co-hosted seminar "IoT Hyouzyunka Saisin Doukou—oneM2M Gizyutu Siyou Ririsu 2 no Zenbou (Latest Trend of IoT standardization—Whole Story of oneM2M technical specification release 2)", 1999-2017 http://www.ttc.or.jp/j/info/seminar/history/rep20160909/download 20160909/.
OM2M, http://www.eclipse.org/om2m/; 2015.
Y.Nishizawa; First Edition, Softbank Creative Corp., May 1, 2012, pp. 283-285, non-official translation; MySQL, Starting with the Basics, Revised edition.
A.Iizawa;v01 Nov. 1991, vol. 23, No. 12 (No. 302 overall), pp. 104-115, non-official traslation; A Fun Course in Databases: 7.
International Search Report issued in PCT/JP2019/022190, mailed on Oct. 9, 2019.

* cited by examiner

Fig. 4

| OriginalSeq | DestinationSeq | content | resourceName | OTHER DATA | ... |
|---|---|---|---|---|---|
| 1 | 1 | 10 | Data1 | | |
| 1 | 2 | 20 | Data1 | | |
| 1 | 3 | 11 | Data1 | | |
| 1 | 4 | 22 | Data1 | | |
| 1 | 5 | 33 | Data1 | | |
| 2 | 6 | 5 | Data2 | | |
| 2 | 7 | 6 | Data2 | | |
| 2 | 8 | 7 | Data2 | | |

Fig. 5

| OriginalSeq | X | Y | resourceName | OTHER DATA | ... |
|---|---|---|---|---|---|
| 1 | 10 | 5 | Data1 | | |
| 2 | 9 | 6 | Data2 | | |

Fig. 6

| OriginalSeq | DestinationSeq | X | Y | resourceName | OTHER DATA | ... |
|---|---|---|---|---|---|---|
| 1 | 1 | 10 | 7 | Data1 | | |
| 1 | 2 | 9 | 6 | Data1 | | |
| 1 | 3 | 8 | 5 | Data1 | | |
| 2 | 4 | 7 | 4 | Data2 | | |

Fig. 7

| OriginalSeq | con | resourceName | OTHER DATA | ... |
|---|---|---|---|---|
| 1 | 10,7,9,6,8,5 | Data1 | | |
| 2 | 7,4 | Data2 | | |

Fig. 8

| OriginalSeq | DestinationSeq | X | Y |
|---|---|---|---|
| 1 | 1 | 10 | 7 |
| 1 | 2 | 9 | 6 |
| 1 | 3 | 8 | 5 |
| 2 | 4 | 7 | 4 |

Fig. 9

| OriginalSeq | DestinationSeq | X | Y | Data Owner | resourceName | OTHER DATA | ... |
|---|---|---|---|---|---|---|---|
| 1 | 1 | 10 | 7 | A | Data1 | | |
| 1 | 2 | 9 | 6 | A | Data1 | | |
| 1 | 3 | 8 | 5 | A | Data1 | | |
| 2 | 4 | 7 | 4 | B | Data2 | | |

DATA PROCESSING SYSTEM, METHOD, AND PROGRAM

CROSS-REFERENCE TO RELATED APPLICATIONS

This is a U.S. national phase application under 35 USC 371 of international application PCT/JP2019/022190, filed on Jun. 4, 2019, which claims priority to Japanese patent application No. 2018-172086, filed on Sep. 14, 2018. The entire disclosures of the above applications are incorporated herein by reference.

TECHNICAL FIELD

Embodiments of the present invention relate to a data processing system, method, and program.

BACKGROUND ART

The oneM2M architecture, which is standardized by oneM2M (a partnership project initiated in order to promote standardization of horizontally-integrated IoT (Internet of Things) platform), and the ETSI (European Telecommunication Standards Institute) TC M2M standard, which is a predecessor of oneM2M, exist (for example, see NPL 1, NPL 2, NPL 3, NPL 4, NPL 5 or NPL 6).

In oneM2M, an application program (which may be hereinafter also referred to as an application) is connected to a common services function called a CSE (Common Services Entity) via an interface (which is an interface between the CSE and an AE (Application Entity)) called mca.

CITATION LIST

Non Patent Literature

[NPL 1] oneM2M Web Site, http://www.onem2m.org/
[NPL 2] oneM2M Specification TS-0001 version 2.10.0
[NPL 3] oneM2M Specification TS-0004 version 2.7.1
[NPL 4] Latest Trend of Horizontally-integrated IoT Platform Standard Specification oneM2M, NTT *Gizyutu* Journal (NTT Technology Journal), 2018.2, pp. 69-72, http://www.ntt.co.jp/journal/1802/files/JN20180269.pdf
[NPL 5] ARIB-TTC co-hosted seminar *"IoT Hyouzyunka Saisin Doukou—oneM2M Gizyutu Siyou Ririsu 2 no Zenbou* (Latest Trend of IoT standardization—Whole Story of oneM2M technical specification release 2)", http://www.ttc.or.jp/j/info/seminar/history/rep20160909/download20160909/
[NPL 6] OM2M, http://www.eclipse.org/om2m/

SUMMARY OF THE INVENTION

Technical Problem oneM2M uses a method of collectively storing various IoT data in <ContentInstance> (which is generated immediately below <container> that works as a container for accumulate data, and stores data) and <TimeSerieseInstance> (which is generated immediately below <timeSeries> that detects a defect in time-series data, and stores a data generation time as an attribute), which are types of resources in the CSE.

In a normal application, data is fetched by designating a URI (Uniform Resource Identifier) of a resource through the mca, and is subjected to processing such as calculation.

Here, an application, which acquires a large volume of data via a network protocol, consumes many calculation resources of computers that respectively stores the CSE and the application, and requires long time to obtain the results (problem (K1)).

In addition, even if calculation that frequently occurs in statistical calculations is needed, usually, a function of performing this calculation needs to be implemented in the application, and the man-hour for the implementation also increases (problem (K2)).

Furthermore, in a system that is not aware of such content, it is difficult to set effective indexes for data, and for this reason, more processing time is required (problem (K8)).

FIG. 10 is a diagram showing an example configuration of a conventional data processing system.

As shown in FIG. 10, in the conventional data processing system, a CSE 120 and a DBMS (Data Base Management System) 130 are provided in a node (Node) 110. The CSE 120 has a request accepting unit 121, a resource processing unit 122, and a perpetuation processing unit 123. Perpetuation refers to processing by which data is stored in a location where it will not be lost even after the program ends.

The request accepting unit 121 accepts data from devices such as a data observing device, or requests from a first application (conversion application) and a second application (statistics application).

The resource processing unit 122 has a first container 122*a* and a second container 122*b* that correspond to container resources (which act as containers for accumulating data).

The perpetuation processing unit 123 performs predetermined processing on data that are accepted by the request accepting unit 121 and stored in the first container 122*a* and the second container 122*b*, and delivers the processing results to the DBMS 130.

Also, the perpetuation processing unit 123 performs predetermined processing corresponding to a request accepted by the request accepting unit 121 on data that is stored in advance in the first container 122*a* and the second container 122*b*, and delivers the processing results to the DBMS 130.

The DBMS 130 perpetually stores data delivered from the perpetuation processing unit 123 in an internal data table 131 or 132. In this example, data delivered from the first container 122*a* via the perpetuation processing unit 123 is stored in the data table 131, and data delivered from the second container 122*b* via the perpetuation processing unit 123 is stored in the data table 132.

There may be cases where data that is substantially a plurality of pieces of logical data stored in a single piece of physical data is sent from a device. As a typical method that is used in this case, as shown in FIG. 10, data stored in the first container 122*a* is fetched by the first application, separated into individual pieces of logical data, and the separated pieces of logical data are stored in the second container 122*b*. Then, the second application that performs statistical calculation on data accesses the second container 122*b* and fetches data.

In this method, firstly, the man-hour for creating the first application is required (problem (K3)), and calculation resources for operating the first application are also required (problem (K4)).

Moreover, the time to operate the first application leads to a delay time of the entire data processing system (problem (K5)). That is to say, a difference occurs from the timing at which data was entered to the first container 122*a* to the timing at which data can be stored in the second container 122b. This leads to a problem that the system cannot be applied to a time-sensitive IoT application (problem (K6)).

Furthermore, since pieces of data that have different formats but are semantically the same in the first container 122a and the second container 122b are stored in the DBMS 130, a more storage area is consumed for the same data (problem (K10)).

There may be cases where the authority to access data stored in the second container 122b differs between the data. In oneM2M, an access control policy (which corresponds to an accessControlPolicy resource (policy for access control) can also be set for each instance. However, for this purpose, a resource for the setting needs to be generated or referenced, which increases the complexity of the application program and also increases the processing time (problem (K7)).

This invention has been made in view of the foregoing situation, and an object thereof is to provide a data processing system, method, and program that enable efficient data processing to be performed.

Means for Solving the Problem

To achieve the above-stated object, in a first aspect of the data processing system according to an embodiment of this invention, the data processing system is a data processing system in which one or more application programs and one or more devices are connected to a database via a network, the system including a processor configured to: perform acceptance processing for accepting a request from the application programs or data from the devices; have a plurality of types of perpetuation functions of performing processing in accordance with a type of the request or the data and perpetually storing a processing result in the database, perform, using the perpetuation functions, processing corresponding to the type of the request or the data accepted through the acceptance processing, and perform perpetuation processing for perpetually storing the processing result in the database; and perform switching processing for switching a destination at which the request or the data accepted through the acceptance processing is processed to one of the plurality of types of perpetuation functions, based on the type of the request or the data accepted through the acceptance processing.

A second aspect of the data processing system of this invention provides a configuration in which, in the first aspect, the processor is further configured to: accept the data from the devices during the acceptance processing; and when a single piece of data accepted through the acceptance processing is physical data including a plurality of pieces of logical data, separate the single piece of data into separate pieces of logical data, and store the separated pieces of the physical data as the processing result in the database, during the perpetuation processing.

A third aspect of the data processing system of this invention provides a configuration in which, in the second aspect, the processor is further configured to store, in the database, the single piece of data that has been accepted through the acceptance processing and assigned a serial number, and the separated pieces of the physical data that are assigned the same serial number as a serial number assigned to the data before being separated, during the perpetuation processing.

A fourth aspect of the data processing system of this invention provides a configuration in which, in the first aspect, the processor is further configured to: accept the data from the devices during the acceptance processing; and when the data accepted through the acceptance processing includes a plurality of types of data that are associated with each other, separate the plurality of types of data by type, and store the separated types of data in the database, during the perpetuation processing.

A fifth aspect of the data processing system of this invention provides a configuration in which, in the first aspect, the processor is further configured to read out the data stored in the database and sets the read data as data that can be accessed by the application program, during the perpetuation processing.

A sixth aspect of the data processing system of this invention provides a configuration in which, in the fifth aspect, the processor is further configured to: read out the data stored in the database, set first data in the read data as data that can be accessed by a first application program, and set second data in the read data as data that can be accessed by a second application program, during the perpetuation processing.

A seventh aspect of the data processing system of this invention provides a configuration in which, in the first aspect, the processor is further configured to: further communicate with a second device different from the device via a network interface, during the perpetuation processing; and transmit and receive information to and from the second device using a second protocol other than a first communication protocol, based on the request accepted conforming to the first communication protocol through the acceptance processing.

An eighth aspect of the data processing system of this invention provides a configuration in which, in the seventh aspect, a storage device for storing information acquired from the second device through the perpetuation processing is further included, and the processor is further configured to: store the information acquired from the second device in the storage device based on a request to acquire information from the second device, the request having been accepted conforming to the first communication protocol through the acceptance processing; and if, based on the request accepted conforming to the first communication protocol through the acceptance processing, information to be acquired indicated by the request is stored in the storage device, read out the information from the storage device.

One aspect of the data processing method according to an embodiment of the present invention is a data processing method performed by a data processing system in which one or more application programs and one or more devices are connected to a database via a network, the system including a processor, the method including: accepting a request from the application programs or data from the devices, by the processor; switching a destination at which the accepted request or data is processed to one of a plurality of types of perpetuation functions of performing processing corresponding to a type of the request or the data and perpetually storing a processing result in the database, based on the type of the accepted request or data, by the processor; and performing processing in accordance with the type of the request or the data using the perpetuation function to which the destination has been switched, and perpetually storing a processing result in the database, by the processor.

One aspect of the data processing program according to an embodiment of the present invention causes the processor to function as each processing of the data processing system according to any one of the first to seventh aspects.

Effects of the Invention

According to the first aspect of the data processing system according to an embodiment of this invention, data processing corresponding to the type of the request or the data type from outside is performed, and data representing the result of the processing is perpetually stored in the database. This configuration makes it possible to perform efficient data processing corresponding to the type of the accepted request or data.

According to the second aspect of the data processing system according to an embodiment of this invention, a single piece of data is separated into pieces of logical data, and the separated pieces of data are stored in the database. Thus, data processing can be performed on each piece of the logical data.

According to the third aspect of the data processing system according to an embodiment of this invention, common serial numbers are assigned to pre-separation data and post-separation data. Thus, rapid response can be realized when the pre-separation data is reacquired, and reproducibility of original data can be improved.

According to the fourth aspect of the data processing system according to an embodiment of this invention, when a plurality of types of data are associated with each other, the plurality of types of data are separated into individual pieces of data, and the separated individual pieces of data are stored in the database. Thus, processing can be performed for each type of data.

According to the fifth aspect of the data processing system according to an embodiment of this invention, data stored in the database is set as data that can be accessed by the application program. Thus, other application programs for generating data that can be accessed by the application program are not needed.

According to the sixth aspect of the data processing system according to an embodiment of this invention, pieces of stored data are categorized, and data of respective categories can be accessed by different application programs. This configuration can reduce the number of access control policies of the data.

According to the seventh aspect of the data processing system according to an embodiment of this invention, information is transmitted to and received from the second device using the second protocol different from the first communication protocol, based on a request accepted conforming to the first communication protocol by acceptance processing. Thus, data can be dynamically acquired from a device on a protocol different from the communication protocol used for the request. With this configuration, not many resources on the system are used during processing of this data, and the lag time occurring when the application program uses the acquired data can be shortened.

According to the eighth aspect of the data processing system according to an embodiment of this invention, information acquired from the second device is stored in the storage device, and if the information to be acquired indicated by the request is stored in the storage device, this information is read out from the storage device. Thus, the information to be acquired can be efficiently acquired.

That is to say, according to those aspects of the invention, efficient data processing can be performed.

BRIEF DESCRIPTION OF DRAWINGS

FIG. 4 is a diagram showing an example of data that the data processing system according to the first embodiment of the present invention stores in a DBMS, in the form of a table.

FIG. 5 is a diagram showing an example of data with an internal structure that the data processing system according to the first embodiment of the present invention stores in the DBMS, in the form of a table.

FIG. 6 is a diagram showing an example of data including logical data with an internal structure that the data processing system according to the first embodiment of the present invention stores in the DBMS, in the form of a table.

FIG. 7 is a diagram showing an example of a pre-separation data table stored in the DBMS of the data processing system according to the first embodiment of the present invention, in the form of a table.

FIG. 8 is a diagram showing an example of a post-separation data table stored in the DBMS of the data processing system according to the first embodiment of the present invention, in the form of a table.

FIG. 9 is a diagram showing an example of data stored in a second container of the data processing system according to the first embodiment of the present invention, in the form of a table.

DESCRIPTION OF EMBODIMENTS

Hereinafter, embodiments related to this invention will be described with reference to the drawings.

First Embodiment

Firstly, the first embodiment of the present invention will be described.

Figure 1:
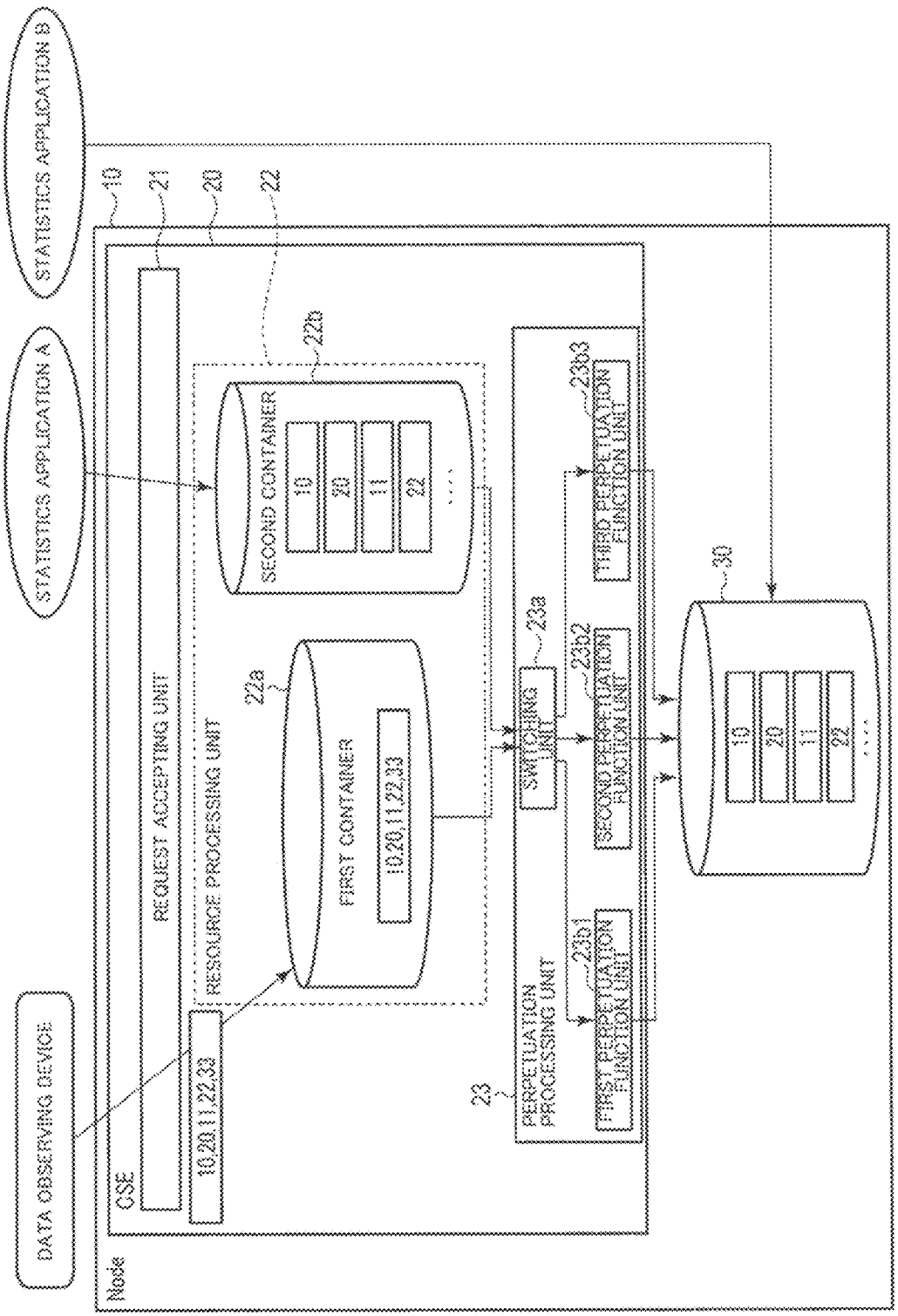
FIG. 1 shows an example configuration of a data processing system according to a first embodiment of the present invention.

FIG. 1 is a diagram showing an example configuration of the data processing system according to the first embodiment of the present invention.

The data processing system according to the first embodiment of the present invention is a data processing system in which one or more application programs and a plurality of devices are connected to a database via a communication network. As shown in FIG. 1, a CSE (data processing device) 20 and a DBMS 30 are provided in a node 10. The CSE 20 has a request accepting unit 21, a resource processing unit 22, and a perpetuation processing unit 23. The details of each unit will be described later. FIG. 1 only shows a data observing device as a device.

The CSE 20 in the node 10 can be realized by a system that uses a computer device, such as a personal computer (PC). For example, the computer device includes a processor such as a CPU (Central Processing Unit), a memory connected to the processor, and an input-output interface. Of these components, the memory is constituted by a storage device that has a storage medium, which is a nonvolatile memory or the like.

Functions of the request accepting unit 21 and the perpetuation processing unit 23 of the CSE 20 are realized by the processor loading a program stored in the memory and executing the loaded program, for example. Note that some or all of these functions may be realized by a circuit such as an application-specific integrated circuit (ASIC).

The resource processing unit 22 is provided in a nonvolatile memory of the aforementioned memory in which/from which data can be written and read out as needed.

The request accepting unit 21 accepts data from a device such as the data observing device, or a request from an application (statistics application etc.).

The resource processing unit 22 has a first container 22a and a second container 22b, which correspond to container resources.

The perpetuation processing unit 23 performs predetermined processing on data that has been accepted by the request accepting unit 21 and stored in the first container 22a, and delivers the processing results to the DBMS 30.

Also, the perpetuation processing unit 23 performs predetermined processing corresponding to a request accepted by the request accepting unit 21 on data that is stored in advance in the second container 22b, and delivers the processing results to the DBMS 30.

The DBMS 30 perpetually stores data that is the processing results delivered from the perpetuation processing unit 23 in an internal data table.

The perpetuation processing unit 23 has a switching unit 23a, a first perpetuation function unit 23b1, a second perpetuation function unit 23b2, and a third perpetuation function unit 23b3. Although a description will be given here of an example where the perpetuation processing unit has three types of perpetuation function units, the number of perpetuation function units is not particularly limited.

The perpetuation function units in the perpetuation processing unit 23 are provided in accordance with one or a combination of the type of data and the URI location thereof on a resource tree. These perpetuation function units perform processing corresponding to one or a combination of the type of data accepted by the request accepting unit 21 and the URI location thereof on the resource tree, and perpetually store the processing results in the DBMS 30.

The switching unit 23a in the perpetuation processing unit 23 recognizes the type of data accepted by the request accepting unit 21, and the URI thereof on the resource tree. The switching unit 23a switches the destination to which the data is to be output, i.e. the destination at which the data is to be processed, to a perpetuation function unit corresponding to one or a combination of the above-recognized type and URI location on the resource tree, of the perpetuation function units in the perpetuation processing unit 23. When this switching is performed, one perpetuation function unit that is effective as the destination at which the data is to be processed is selected out of a plurality of types of perpetuation function units in the perpetuation processing unit 23.

The perpetuation function units in the perpetuation processing unit 23 are provided in accordance with one or a combination of the type of a request and the URI location thereof on the resource tree. These perpetuation function units perform processing corresponding to one or a combination of the type of a request accepted by the request accepting unit 21 and the URI location thereof on the resource tree, on data that is stored in advance in the second container 22b, and perpetually stores the processing results in the DBMS 30.

The switching unit 23a in the perpetuation processing unit 23 recognizes the type of request accepted by the request accepting unit 21 and the URI location thereof on the resource tree. Then, the switching unit 23a switches the destination to which this request is to be output, i.e. the destination at which the data is to be processed, to a perpetuation function unit corresponding to one or a combination of the recognized type and URI location on the resource tree, of the perpetuation function units in the perpetuation processing unit 23.

An example of a configuration that can be realized by the first embodiment of the present invention will be described. Here, a description will be given of realization of the following (S1) to (S9) and (SB1).

(S1)

The plurality of types of perpetuation function units are enabled to be plugged into the perpetuation processing unit in the CSE of oneM2M.

In (S1), a function can be dynamically invoked in various programming languages (Java (registered trademark), C++, ruby, python etc.) by realizing the perpetuation function units as a class for implementing a shared interface.

Here, for example, an interface of the perpetuation function units can be represented by a description ending at (LIST 1) as in the following example.

Example of Interface

```
Interface PersistenceLayer {
    void create( String uri, Resource r);
    Resource retrieve(String uri);
    void update( String uri, Resource r);
    void delete(String uri);
}
(LIST1)
```

Here, the Resource class is a superclass of each of specific Resource classes. Each of the specific classes can be realized by a class such as JavaBean. That is to say, a specific class is an object that has an acquisition method and a configuration method. In another mode, a specific class may be a simple object that has a public field, or may be an object that expresses JSON.

(S1-1)

The above plug-in can be created in accordance with requirements by a developer, and a plurality of types of perpetuation function units can be simultaneously used in a single CSE 20.

Next, a description will be given of code that realizes a function of implementing the aforementioned create, retrieve, update, and delete methods, decomposing data to an appropriate granularity, and storing the data in the back-end DBMS 30.

This code can be separated by a logical data unit as follows and stored in the DBMS 30, for example.

Example of Code

```
MyEizokuka {
    void create(uri, Resource r) {
        String con = r.getCon( );
        String[ ] data = con.split(",");
        for(String item: data) {
            Resource r2 = new ContentInstance( );
            R2.con = item;
            DB.store(r2 );
        }
    }
    ...
}
```

In the above example code, code related to create (creation) is described. However, code related to retrieve (acquisition of data content), update (updating of data), and delete (deletion) can also be stored in the DBMS 30.

(S1-2)

A configuration file for assigning names of the aforementioned perpetuation function units is prepared based on one or a combination of the type of a resource and the URI location thereof on the resource tree, and is stored in an internal memory (not shown) in the CSE 20.

For example, the following configuration file can be prepared.

Example of Configuration File

```
<rules>
  <rule>
    <name>rule1</name>
    <uri>/a/b/c</uri>
    <resourceTypes>
      <resourceType>4</resourceType>
      <resourceType>5</resourceType>
    </resourceTypes>
    <driver>jp.co.ntt.onem2m.MyEizokuka1
  </driver>
  </rule>
  <rule>
    <name>rule2</name>
    <uri>/a/b/d </uri>
    <resourceTypes>
      <resourceType>4</resourceType>
      <resourceType>5</resourceType>
    </resourceTypes>
    <driver>jp.co.ntt.onem2m.MyEizokuka2
  </driver>
  </rule>
  <rule>
    <name>rule3</name>
    <uri>*</uri>
    <resourceTypes>
      <resourceType>10</resourceType>
    </resourceTypes>
    <driver>jp.co.ntt.onem2m.MyEizokuka3
  </driver>
  </rule>
```

In this configuration file, "*" means that it corresponds to a URI. A name corresponding to any of various perpetuation function units mentioned above is written within the Driver tags in the configuration file. For example, "MyEizokuka1", "MyEizokuka2", and "MyEizokuka3" within the Driver tags may be the names that correspond respectively to the first perpetuation function unit 23$b$1, the second perpetuation function unit 23$b$2, and the third perpetuation function unit 23$b$3 in the aforementioned perpetuation processing unit 23.

(S1-3)

The perpetuation processing unit is provided with the switching unit. This switching unit loads a configuration file, and switches the perpetuation function unit to be the destination at which necessary processing for a request is to be performed.

Figure 2A:
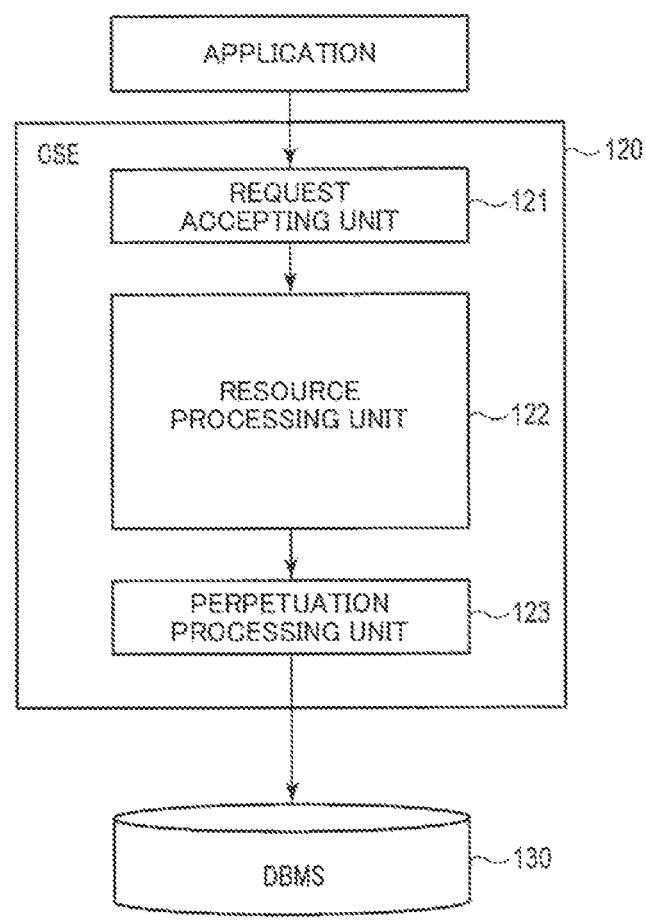
FIG. 2A is a diagram illustrating comparison between a functional configuration of a conventional data processing system and a functional configuration of a data processing system according to an embodiment of the present invention.
Figure 2B:
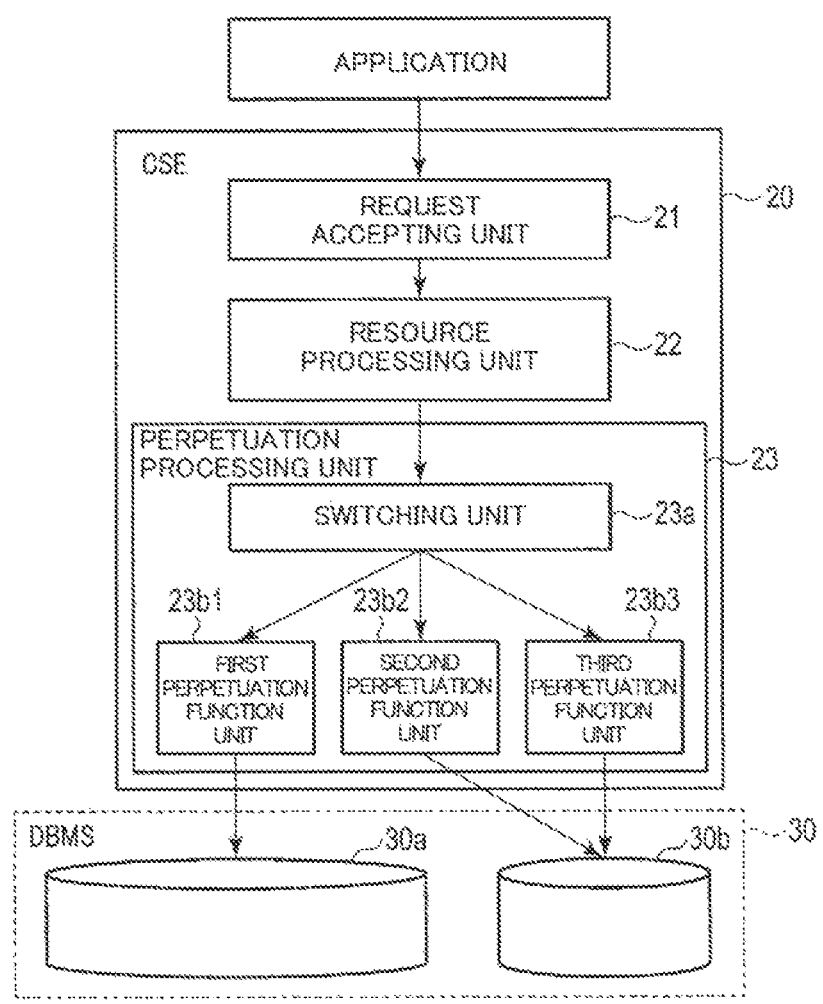
FIG. 2B is a diagram illustrating comparison between the functional configuration of the conventional data processing system and the functional configuration of the data processing system according to an embodiment of the present invention.

FIGS. 2A and 2B are diagrams illustrating comparison between a functional configuration of a conventional data processing system and a functional configuration of the data processing system according to the first embodiment of the present invention. FIG. 2A corresponds to the conventional data processing system, and FIG. 2B corresponds to the data processing system according to the first embodiment of the present invention.

As shown in FIG. 2B, in the first embodiment of the present invention, the switching unit 23$a$ and the perpetuation function units 23$b$1, 23$b$2, and 23$b$3 are provided in the perpetuation processing unit 23, unlike a perpetuation processing unit 123 in the conventional example. This switching unit 23$a$ assigns uri and resourceType in an upper request to a perpetuation function unit designated by the configuration file.

Figure 3:
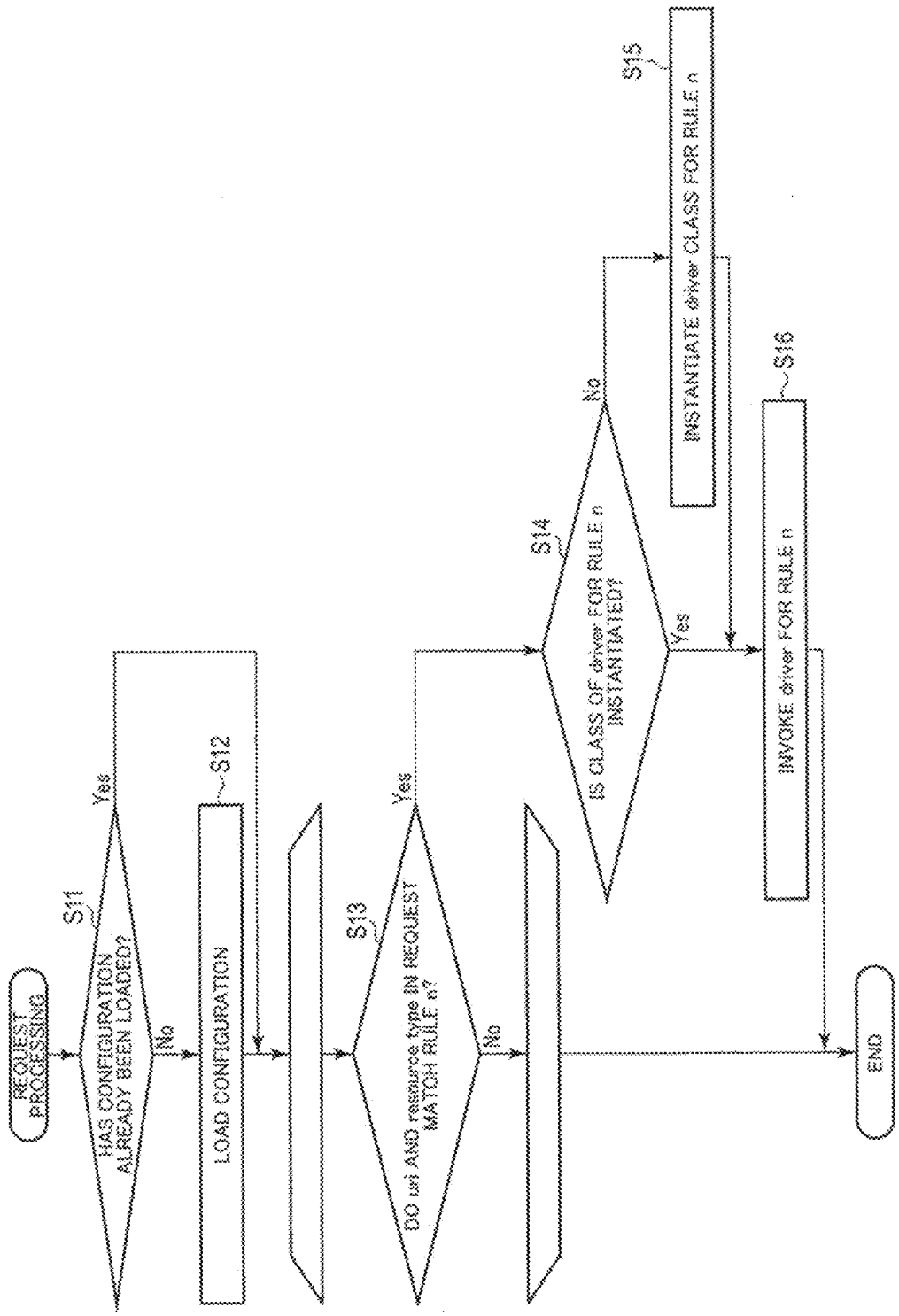
FIG. 3 is a flowchart showing an example of a processing operation performed by a switching unit of the data processing system according to the first embodiment of the present invention.

FIG. 3 is a flowchart showing an example of a processing operation performed by the switching unit of the data processing system according to the first embodiment of the present invention.

When the processing operation is performed for the first time, the switching unit 23$a$ of the perpetuation processing unit 23 loads the configuration file from the CSE 20 (S11→S12). If uri and resourceType in the request match one of the rules registered in the configuration file (Yes in S13), the switching unit 23$a$ specifies a perpetuation function unit corresponding to the name written with the driver tag in the matched rule, out of the plurality of types of perpetuation function units 23$b$1, 23$b$2, and 23$b$3 in the perpetuation processing unit 23. If the class of driver corresponding to the specified perpetuation function unit is uninstantiated (No in S14), the switching unit 23$a$ instantiates this class (S15), and invokes driver for the aforementioned matched rule (S16). If the class of driver corresponding to the above-specified perpetuation function unit is instantiated (Yes in S14), the switching unit 23$a$ invokes driver for the aforementioned matched rule (S16).

A parameter that is the same as a parameter of the switching unit is used as a parameter of the invoked driver.

The class of driver for the switching unit may be the same as the class indicated in (LIST1) above, which is the interface of the perpetuation function units.

(Method of Configuring Perpetuation Function Units)

(S2)

One of the plurality of types of perpetuation function units in the perpetuation processing unit 23 receives a single piece of data delivered from the resource processing unit 22. In the example shown in FIG. 1, the plurality of types of perpetuation function units are the first perpetuation function unit 23$b$1, the second perpetuation function unit 23$b$2, and the third perpetuation function unit 23$b$3. When a single piece of data is delivered as mentioned above, if this data includes a plurality of pieces of logical data, i.e. if the delivered data is physical data including a plurality of pieces of logical data, one of the plurality of types of perpetuation function units separates the delivered data into pieces of logical data, and stores the separated pieces of physical data as the processing results in the DBMS 30.

For example, a description will be given of the case where a plurality of pieces of logical data are stored, comma delimited, in input data.

FIG. 4 is a diagram showing an example of data that the data processing system according to the first embodiment of the present invention stores in the DBMS, in the form of a table. FIG. 4 illustrates an example where OriginalSeq, DestinationSeq, content, resourceName, other data, and so on, are provided as attributes in columns, and "10, 20, 11, 22, 33" are present as content of ContentInstance of the resources.

In the example shown in FIG. 4, five pieces of logical data are included in one piece of physical data, and thus, the first perpetuation function unit 23b1 separates these pieces of data into individual pieces, and stores the separated pieces of data in the DBMS 30. At this time, since these pieces of logical data have been included in the same physical data, "1" is set in common as OriginalSeq of the data shown in FIG. 4. Serial numbers "1" to "5" are set as DestinationSeq of the data shown in FIG. 4.

Next, if three pieces of logical data, which are "5, 6, 7", have arrived, as the input data that is the second physical data, at the first perpetuation function unit 23b1, "2", which is obtained by adding 1 to the aforementioned "1", is assigned to the column of OriginalSeq of the data shown in FIG. 4.

The resources in oneM2M also include attributes other than content. For example, an attribute "resourceName" is an attribute that means a name, and is included in resource. Although other data also exists, detailed description thereof is omitted.

If a request to acquire data corresponding to specific resourceName is accepted by the request accepting unit 21, the perpetuation processing unit 23 connects, in ascending order of DestinationSeq, records that correspond to the specific resourceName, of the records stored in the DBMS 30, and returns the connected records to the request source. (S3)

When input data is delivered to one of the plurality of types of perpetuation function units in the perpetuation processing unit 23 from the resource processing unit 22 via the switching unit 23a, if this data has an internal structure within one piece of logical data, the configuration of this perpetuation function unit is as follows. In this case, this perpetuation function unit is configured to store the data in a schema corresponding to the internal structure of the data in the database stored in the DBMS 30.

A description will be given of the case where, for example, input data is constituted by a plurality of types of data, namely data of two types, which are x and y, that are comma-delimited and associated with each other. The plurality of types of data associated with each other represent a position on an x-axis and a y-axis, acceleration, or the like. For example, it is assumed that, firstly, first physical data: "10, 5" and then the second physical data: "9, 6" is delivered from the resource processing unit 22 to the perpetuation processing unit 23. Then, in this case, the perpetuation processing unit 23 separates the aforementioned comma-delimited data into two pieces by type in accordance with x and y, and inserts values of the separated pieces of data into x and y columns, respectively.

FIG. 5 is a diagram showing an example of data with an internal structure that the data processing system according to the first embodiment of the present invention stores in the DBMS, in the form of a table. In FIG. 5, OriginalSeq, X, Y, resourceName, other data, and so on, are provided as attributes in columns.

If a request to acquire Data1 as resourceName is accepted from the request accepting unit 21, the perpetuation processing unit 23 connects an x column and a y column in a corresponding record and returns the connected columns to the request source. (S4)

In S4, a description will be given of the case where input data includes data in the form of "x1, y1, x2, y2, x3, y3". That is to say, this is the case where a plurality of pieces of logical data with an internal structure is connected and delivered, as a single piece of physical data, from the resource processing unit 22 to the perpetuation processing unit 23.

Here, of the aforementioned input data: "x1, y1, x2, y2, x3, y3", a first piece of logical data with an internal structure is data: "x1, y1", a second piece of logical data with an internal structure is data: "x2, y2", and a third piece of logical data with an internal structure is data: "x3, y3".

Here, a description is given of the case where the input data: is "10, 7, 9, 6, 8, 5", and a first piece of physical data that includes three pieces of logical data ("10, 7", "9, 6", "8, 5") and a second piece of physical data that includes the one piece of logical data: "7, 4" are delivered from the resource processing unit 22 to the perpetuation processing unit 23.

FIG. 6 is a diagram showing an example of data including logical data with an internal structure that the data processing system according to the first embodiment of the present invention stores in the DBMS, in the form of a table. In FIG. 6, OriginalSeq, DestinationSeq, X, Y, resourceName, other data, and so on, are provided as attributes in the columns. (S5)

(S2) and (S4) above have described an example where only the data that has been converted (separated) by the perpetuation processing unit 23 is stored in the DBMS 30, whereas (S5) will describe an example where the perpetuation processing unit 23 stores, in the DBMS 30, pre-conversion data, i.e. data before values of input data are separated, and post-conversion data, i.e. data after the values of the input data are separated.

FIG. 7 is a diagram showing an example of a pre-separation data table stored in the DBMS of the data processing system according to the first embodiment of the present invention, in the form of a table. In the data shown in FIG. 7, OriginalSeq, con, resourceName, other data, and so on, are provided as attributes in columns.

FIG. 8 is a diagram showing an example of a post-separation data table stored in the DBMS of the data processing system according to the first embodiment of the present invention, in the form of a table. In the data shown in FIG. 8, OriginalSeq, DestinationSeq, X, and Y are provided as attributes in columns.

Here, a description will be given of an example where input data is stored in two tables that are the "pre-separation data table" shown in FIG. 7 and the "post-separation data table" shown in FIG. 8.

Here, the pre-separation data is stored in the "pre-separation data table". In the example shown in FIG. 7, one piece of physical data is stored in each row. In the example shown in FIG. 8, data obtained by separating physical data is stored in each row. Also, the values in the "con" column in the pre-separation data table are written separately into the rows in the "X" and "Y" columns in the "post-separation data table". The OriginalSeq column in the "post-separation data table" is an external reference key, and references the column with the same name in the "pre-separation data table".

In the examples shown in FIGS. 7 and 8, data in which one piece of pre-separation physical data: "10, 7, 9, 6, 8, 5" is stored is assigned OriginalSeq: "1", and a first piece of logical data: "10, 7", a second piece of logical data "9, 6", and a third piece of logical data: "8, 5" that are obtained by separating the aforementioned data are assigned OriginalSeq: "1", which is assigned to the pre-separation data, in common.

In this embodiment, the perpetuation processing unit 23 can store, in the DBMS 30, a single piece of data that is accepted before separation and assigned OriginalSeq, which is a serial number for each data, and individual pieces of physical data that is obtained by separating the single piece of data and assigned the serial number OriginalSeq that is assigned to the pre-separation data.

This configuration makes operations such as connection unnecessary when data to be stored in original container is reacquired, and thus, rapid response can be expected. In addition, a logic of connection need not be set, and the reproducibility of original input data improves.

Even if there are cases where the displayed number of digits after the decimal point of the original input data modifications, or a space or the like in the original data is omitted, the original data can be accurately returned.

Meanwhile, a large amount of storage capacity of the DBMS 30 is consumed. However, it is advantageous that attributes such as resourceName or other data, or the like need not be redundantly stored.

(S6)

For processing corresponding to a request from an application on data to be stored in the second container 22b, the perpetuation function unit maps one piece of logical data to be processed onto the second container 22b, and makes the mapped data public as the following data. The following data refers to accessible data with which a request-source application specifies the data to be processed in accordance with the request. Here, this perpetuation function unit is any of the first perpetuation function unit 23b1, the second perpetuation function unit 23b2, and the third perpetuation function unit 23b3 in the perpetuation processing unit 23 switched by the switching unit 23a in accordance with the following information. The following information refers to one or a combination of the type of request from the application and a URI location thereof on the resource tree.

Here, a description is given using stored data shown in FIG. 4.

The perpetuation function unit switched by the switching unit 23a maps each row of the data shown in FIG. 4 to ContentInstance, which is a resource managed by the resource processing unit 22, and delivers the data. This perpetuation function unit is operated exclusively to load data.

(S7)

The perpetuation function unit switched by the switching unit 23a changes a container to which the data is to be mapped in the second container 22b, by referencing a specific field of the data.

FIG. 9 is a diagram showing an example of data stored in the second container of the data processing system according to the first embodiment of the present invention, in the form of a table. In the data shown in FIG. 9, OriginalSeq, DestinationSeq, X, Y, Data Owner, resourceName, other data, and so on, are provided as attributes in columns.

In (S6) above, the perpetuation function unit switched by the switching unit 23a maps each row of the data shown in FIG. 4 to a sole container in the second container 22b, whereas, in (S7), the perpetuation function unit switched by the switching unit 23a references the value in the Data Owner column shown in FIG. 9, and causes only a container corresponding to this value to reference data, for example.

That is to say, it is possible to make only the data with DestinationSeq: "1, 2, 3" visible from a Container A in the second container 22b, and make only the data with DestinationSeq: "4" visible from a Container B in the second container 22b.

If this configuration can be achieved, there is an advantage that an access control policy for data can be readily set. That is to say, expected access control can be realized by creating two access control policies, namely an access control policy to permit an application that has authority related to the Container A to access the Container A, and an access control policy to permit an application that has authority related to Container B to access the Container B.

Figure 10:
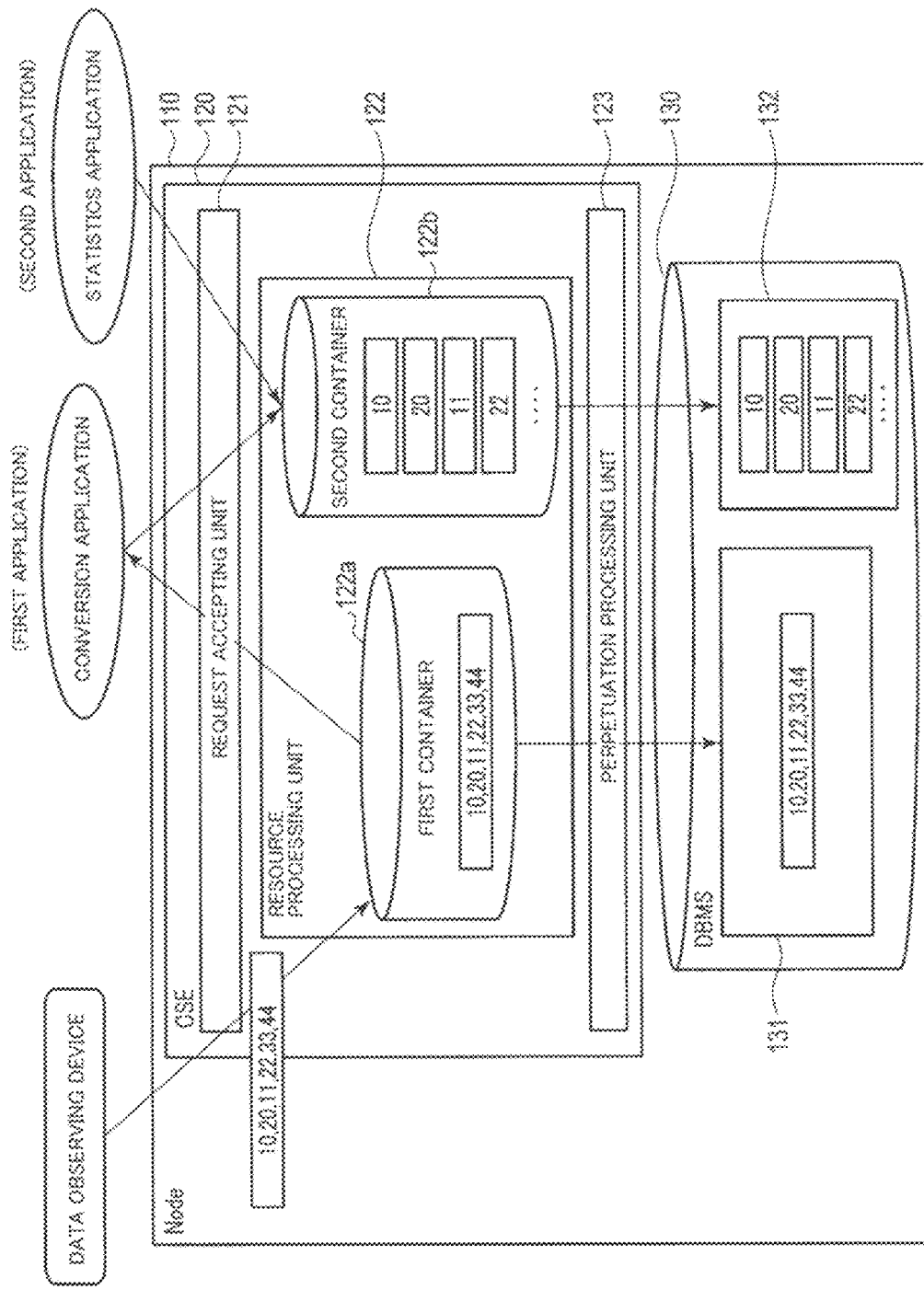
FIG. 10 is a diagram showing an example configuration of the conventional data processing system.

With the conventional configuration shown in FIG. 10, in the example of the data shown in FIG. 9, an access control policy needs to be set for each row, and thus, four access control policies need to be set. If the data volume further increases, it is obvious that the difference in the number of access control policies to be set further increases.

(S8)

The DBMS 30 is constituted by a database with a calculation function that is internal statistical calculation or the like, such as an RDB (Relational database), and this database is configured to be accessible from an application.

As shown in FIG. 1, if access from a statistics application B to the DBMS 30 is permitted, and the DBMS 30 is an RDB, a processing request can be made to the statistics application B using the SQL language. In the case of other types of databases as well, the DBMS 30 can be accessed using a similar query language. Thus, the statistics application B can carry out statistical calculation using the SQL language that the DBMS 30 has.

With this configuration, data need not be transferred between the DBMS 30 and the CSE 20, compared with the conventional technique. Thus, rapid calculation processing can be carried out. In addition, since a calculation function such as a statistical function that the DBMS 30 has can be used, a logic of this function need not be designed during an analysis program, and development man-hours can be reduced.

(S9)

A table with a schema conforming to the meaning of data is set in a database in the DBMS 30. Thus, an index for a frequent search can be readily generated.

(SB1)

A definition of data and a schema are read, and a perpetuation function unit and a table in the database are generated during execution.

The above examples are based on the premise that the perpetuation function unit is created by a developer in accordance with assumed data and the schema of the database.

In contrast, in (SB1), the perpetuation function unit generates the schema of the database and a conversion program based on meta information in a data form.

Examples of metadata may include XSD (XML Schema Definition), and the following definition is possible.

The perpetuation function unit can acquire, using metadata, data included therein, a name thereof (ValueA, ValueB), and type information (string, Boolean). The perpetuation function unit can readily generate a table based on the acquisition results, and can also generate a program to be inserted into the aforementioned table, based on the original data.

Example of Definition of Metadata

```
<xs:element name="MyData">
    <xs:complexType>
        <xs:sequence>
            <xs:element name="ValueA"
type="xs:string" />
            <xs:element name="ValueB"
type="xs:boolean" />
        </xs:sequence>
    </xs:extension>
    </xs:complexContent>
</xs:element>
```

It is possible to create the perpetuation function unit using this function, at the same time as causing this file to be loaded.

Effects of solving the above-described problems (B means Benefit) will be described below.

(B1) And (B2): Effects Achieved when Problems (K1) and (K2) are Solved (S8) makes it possible to create an analysis application using an analysis function that the DBMS 30 has, and thus, development man-hours can be reduced. Since analysis processing is performed within the DBMS 30, and data need not be transferred between the DBMS 30 and the CSE 20, resources can be saved, and high-speed processing can be realized.

(B8): Effects Achieved when Problem (K8) is Solved (S9) provides a configuration in which a table with a schema conforming to the meaning of data is prepared, and thus, Index for a data search can be readily set.

(B5): Effects Achieved when Problem (K5) is Solved

Since data is stored in the first container 22a, and data is also prepared in the second container 22b, a result can be promptly obtained.

(B3) And (B4): Effects Achieved when Problems (B3) and (B4) are Solved

Since the conversion application shown in FIG. 10 is not necessary, calculation resources in the computer can be effectively used.

(B6): Effects Achieved when Problem (B6) is Solved

The delay time mentioned in (B5) is solved, and (S9) makes more IoT applications applicable.

(B10): Effects Achieved when Problem (K10) is Solved

Due to (S2), (S3), and (S4), only post-conversion data is stored, and thus, the storage area of the DBMS 30 can be saved.

(B7): Effects Achieved when Problem (K7) is Solved

Due to (S9), settings of access control policies can be simplified, and an effect of improving processing time can be achieved.

Although this embodiment has been described based on oneM2M as a reference, the embodiment can be similarly realized even in the case of the ETSI TC M2M standard, which is the predecessor of oneM2M, with consideration given to differences in the terms.

Although this embodiment has been described mainly regarding examples using a Container resource and a ContentInstance resource, the embodiment can also be similarly realized by using a TimeSeriese resource (which plays a role similar to the container resource and is capable of detecting a defect in time-series data) and a TimeSerieseInstance resource. Note that the embodiment can also be similarly realized by using a FlexContainer resource (which customizes attributes to be stored, and handles various types in Interworking).

Although this embodiment has been described mainly regarding examples of using Java as various codes, the embodiment can also be similarly realized using other programming languages.

Second Embodiment

Next, the second embodiment of the present invention will be described.

Figure 11:
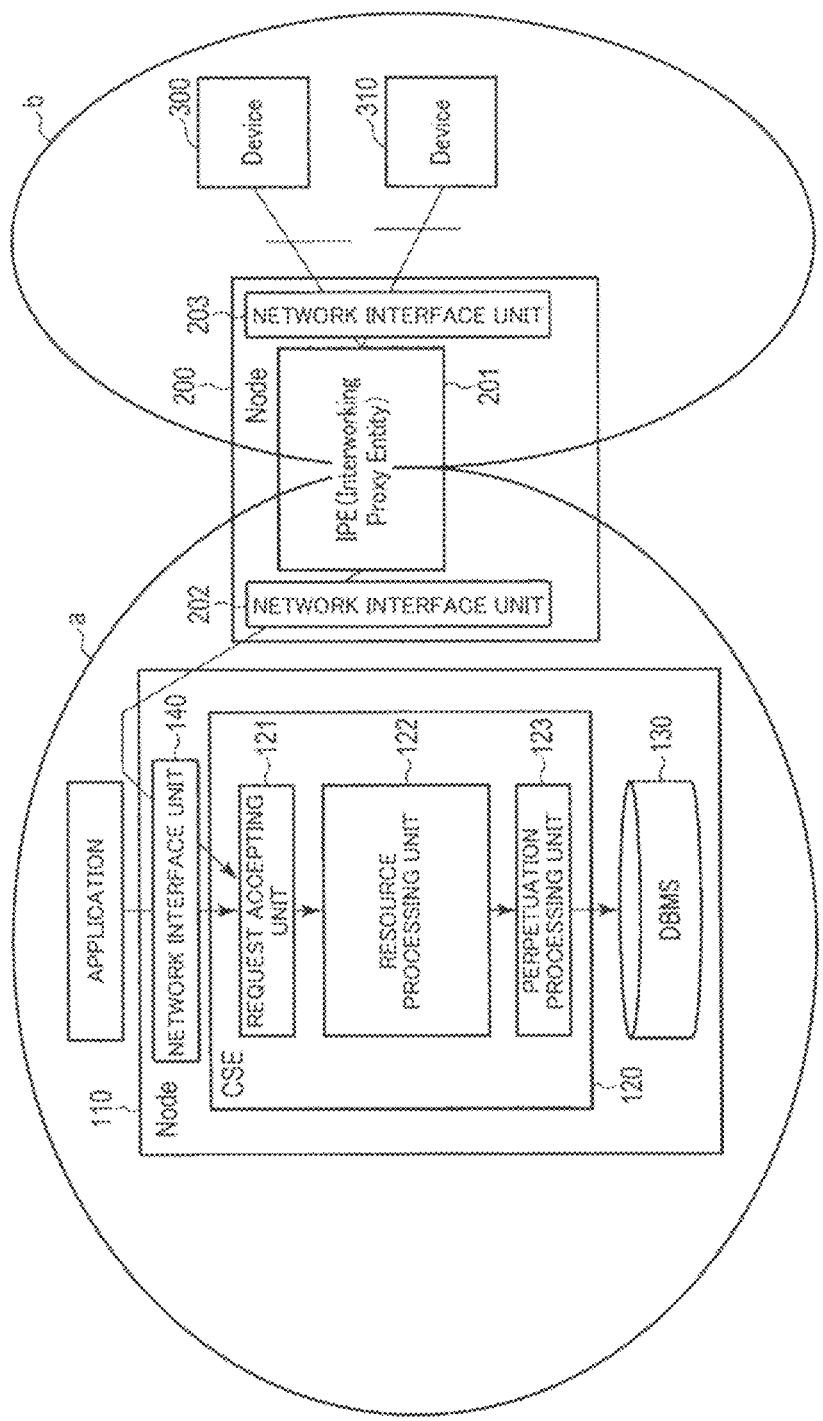
FIG. 11 is a diagram showing an example of a typical Interworking method in oneM2M.

FIG. 11 is a diagram showing an example of a typical Interworking method in oneM2M.

As shown in FIG. 11, an IPE (Interworking Proxy Entity) 201 and network interface units 202 and 203 are provided in another node 200. As shown in FIG. 11, the typical Interworking method in oneM2M is performed in a manner in which, in the CSE 120 in oneM2M, data in another protocol/standard is acquired via the network interface unit 202 in the IPE 201 and the network interface unit 140 in the CSE 120, converted, and is stored in the DBMS 130.

The IPE 201 connects to external devices 301 and 310 via the network interface unit 203 using a non-oneM2M protocol, and detects a status and a change in a parameter. In this mode, if values or the like on the other protocol/standard side are frequently updated, many calculation resources in the IPE 201 and the CSE 120 are used, and large storage areas in the CSE 20 and the DBMS 130 are also used.

For example, if the IPE 201 is configured to copy data to the CSE 120 every time data is updated, and sensor values of the devices 300 and 310 on the non-oneM2M protocol are updated every 10 msec, the frequency is as follows. In this case, data acquisition from the devices 300 and 310, data conversion, writing in the CSE 120, and the following writing in the DBMS 130 by the IPE 201 occur 100 times per second.

In addition, since data copied to the CSE 120 by the IPE 201 is used by a data-using application, a relatively large time difference (lag time) occurs from when data is generated until the data is used.

For example, if the IPE 201 is configured to copy data to the CSE 120 every other second, and sensor values of the devices 300 and 310 on the non-oneM2M protocol are updated every 10 msec, a maximum lag time of about one second occurs when the application browses the data copied to the CSE 120.

Figure 12:
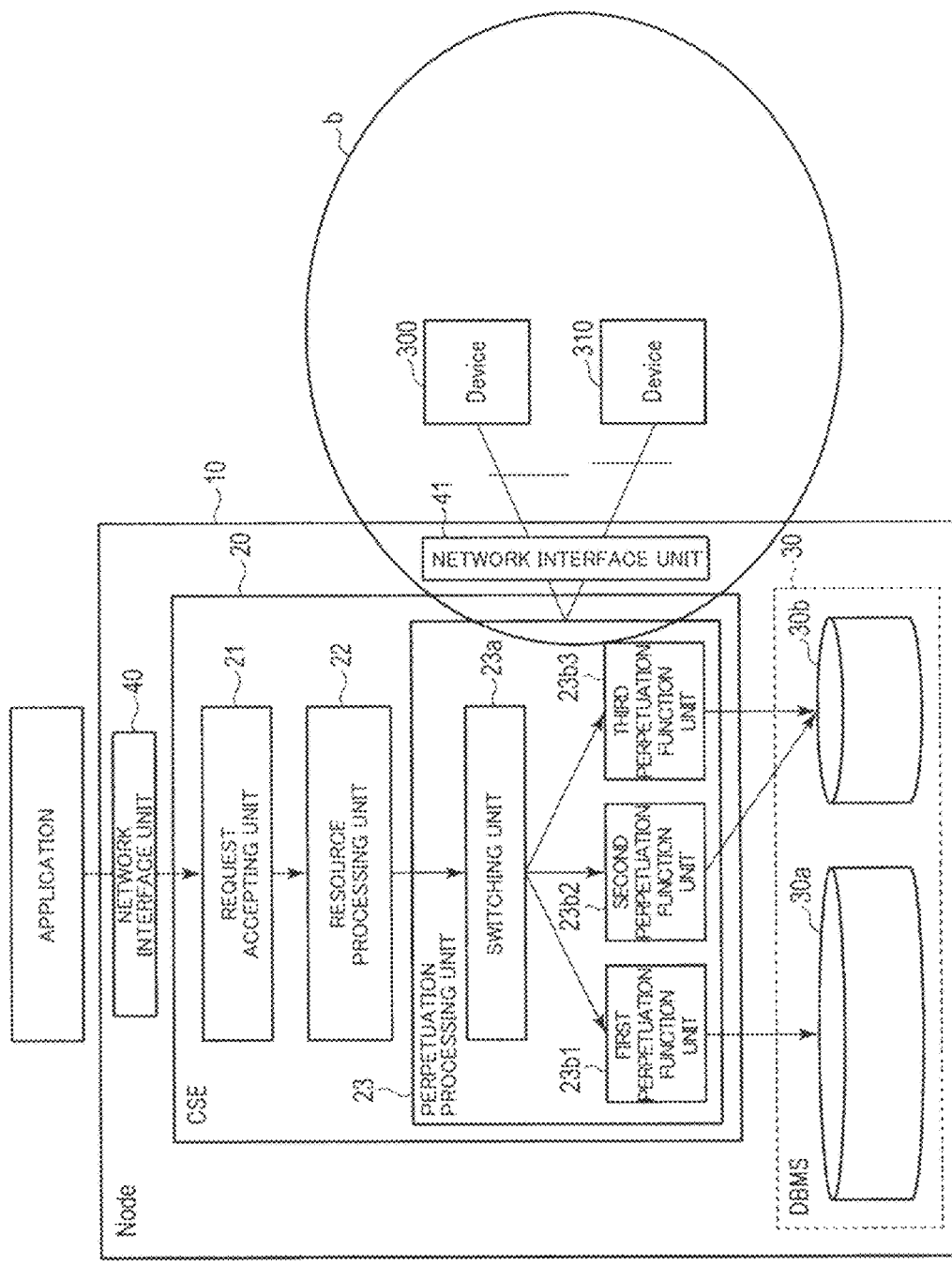
FIG. 12 is a diagram showing an example of a functional configuration of a data processing system according to a second embodiment of the present invention.

FIG. 12 is a diagram showing an example of a functional configuration of a data processing system according to the second embodiment of the present invention.

In the example shown in FIG. 12, compared with FIG. 2B, the node 10 has a network interface unit 40 that communicates with an application, and a device network interface unit 41 that communicates with an external device.

In the example shown in FIG. 2B, the perpetuation function unit 23b3 in the perpetuation processing unit 23 is connected to the DBMS 30. Instead, as shown in FIG. 12, the perpetuation function unit 23b3 is configured to communicate with a device outside the node 10 via the device network interface unit 41 in the node 10, using a non-oneM2M protocol, and thus, the aforementioned problem can be solved. Here, specific examples of non-oneM2M protocols may include UPnP (registered trademark), DLNA (registered trademark), ZigBEE (registered trademark), Bluetooth (registered trademark), DeviceWebAPI, LoRaWAN (registered trademark), and so on, but are not limited thereto.

By using this configuration, even if values on the other protocol/standard side are frequently updated, not many calculation resources (CPU processing time, memory) of the CSE 20 will be used, and a particularly large storage area on the CSE will not be used either.

In addition, when required by the application, the node 10 dynamically attempts to acquire data from a device on the non-oneM2M protocol, and thus, a relatively large lag time will not occur.

Next, a description will be given of an example where, for example, the switching unit 23a in the perpetuation processing unit 23 and the device network interface unit 41 shown in FIG. 12 cooperate with each other and operate as described in (1) to (5) below. Although the description will be given using the Java language, this need not be the case, and any other language may alternatively be used. Although the description will be given using an example using a simple API (application programming interface) in order to simplify the description, the API to be used is not limited thereto.

(1) String[ ] getList (String uri); // Return the URI of a resource immediately below a given URI.
(2) Object getResource (String uri) // Return the entire resource corresponding to the given URI.
(3) Object [ ] getResourceWithSpecifiedAttribute (String uri, String [ ] attributeNameList) // Return a designated attribute of the resource corresponding to the given URI.
(4) Void updateResource (String uri, String [ ] attributeNameList, Object [ ] attributeValueList); // Update the resource of the given URI with an attribute value indicated by attributeNameList and attributeValueList.
(5) Void deleteResource (String uri) // Delete the resource corresponding to the given URI.

Also, an example will be described where, in a non-oneM2M protocol, the communication protocol for a device is as described in (11) to (15) below.

(11) Device [ ] DiscoverDevice ( ); // Discover a device and return the discovered device as a sequence.
(12) String [ ] getDeviceAttributeList (Device d); //Return a sequence of an attribute name that the device has.
(13) Object [ ] getDeviceAttributeValue (Device d, String [ ] attributeNames); // Return, as a sequence, an attribute value for a designated attribute name of the device.
(14) void setDeviceAttributeValue (Device d, String [ ] attributeNames, Object [ ] attributeValueList); //Return, as a sequence, an attribute value for the designated attribute name of the device.

An example will be described where the URI handled by the perpetuation function unit 23b3 is as described in (21) below.

(21) -/IWKG/ProtocolX/{deviceName}

Figure 13:
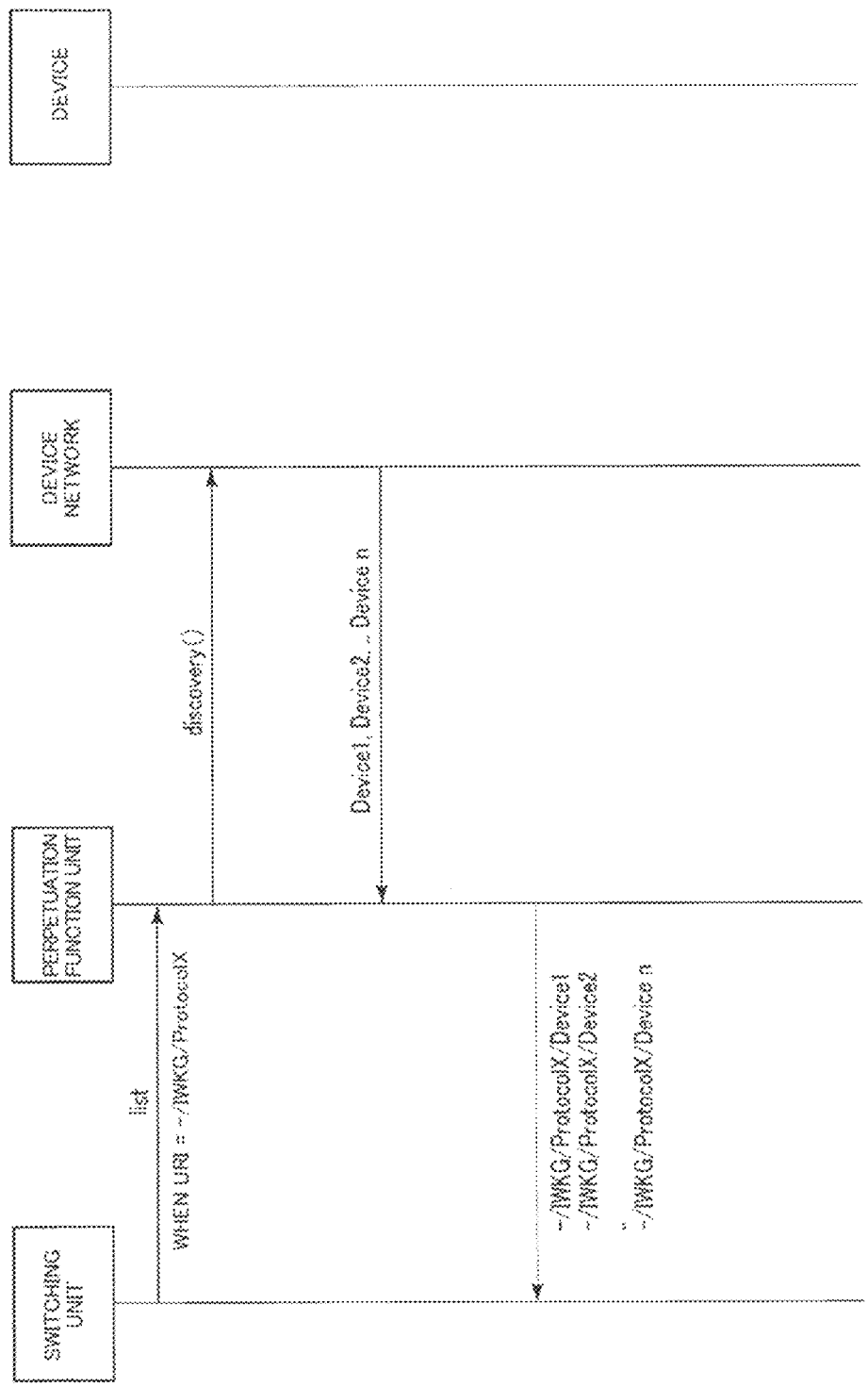
FIG. 13 is a diagram showing an example of a processing operation performed when list( ) of a perpetuation function unit is invoked.

FIG. 13 is a diagram showing an example of a processing operation performed when list( ) of a perpetuation function unit is invoked.

Next, a description will be given of processing performed when list( ) of the perpetuation function unit 23b3 is invoked as "URI=-/IWKG/ProtocolX/". In a physical meaning, this corresponds to the perpetuation function unit 23b3 making a request for a device list.

The perpetuation function unit 23b3 executes discovery( ) for a device network, which is a network between the device and the node 10, and a list of device names acquired from this device network (e.g. Device1, Device2, . . . Device n) is returned to the perpetuation function unit 23b3.

Here, the perpetuation function unit 23b3 that has received the list connects the device names indicated in the acquired list to the above-invoked URI to create a sequence (e.g. -/IWKG/ProtocolX/Device1, -/IWKG/ProtocolX/Device2, . . . -/IWKG/ProtocolX/Device n), and returns the created sequence to the switching unit 23a.

Although, in the above description, the device network is a network that corresponds to discovery( ) the device network may alternatively be any other device network. In the case where a network manager exists between the node 10 and the device and manages the network, the perpetuation function unit 23b3 may make an inquiry to this network manager.

Figure 14:
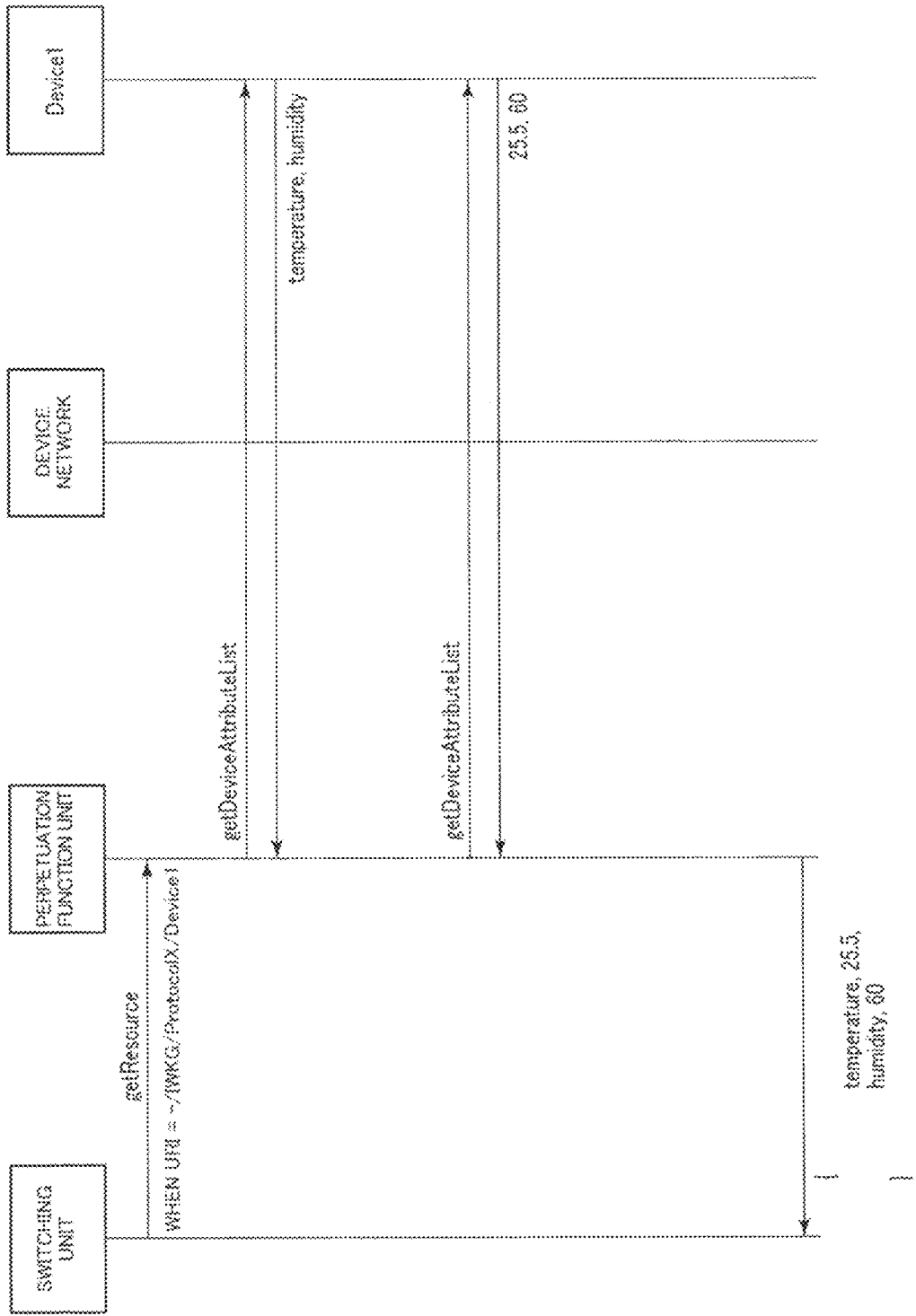
FIG. 14 is a diagram showing an example of a processing operation performed when getResource( ) of the perpetuation function unit is invoked.

FIG. 14 is a diagram showing an example of a processing operation performed when getResource( ) of a perpetuation function unit is invoked.

Next, a description will be given of processing performed when getResource( ) of the perpetuation function unit 23b3 is invoked as "URI=-/IWKG/ProtocolX/Device1". In a physical meaning, this corresponds to all attribute values of a device (hereinafter referred to as "Device1") with a device name: "Device1" being returned to the perpetuation function unit 23b3. An example of a thermo-hygrometer will be described.

The perpetuation function unit 23b3 invokes getDeviceAttributeList( ) for acquiring an attribute name that the Device1 has. Here, it is assumed that the "Device1" has two types of attributes that are "temperature" and the "humidity", and these attribute names are returned to the perpetuation function unit 23b3.

The perpetuation function unit 23b3 designates values corresponding to the obtained attribute names as augments: attributeNames, and invokes getDeviceAttributeValue( ).

Here, an attribute value: "25.5 (° C.)", which is the value of the attribute: "temperature", and a value "60(%)", which is the value of the attribute: "humidity", are returned from the "Device1" to the perpetuation function unit 23b3.

The perpetuation function unit 23b3 that has received these values returns a set of the above attribute names and the attribute values corresponding to these attribute names to the switching unit 23a. Although the illustration in FIG. 14 is given using the form of JSON, this need not be the case.

Figure 15:
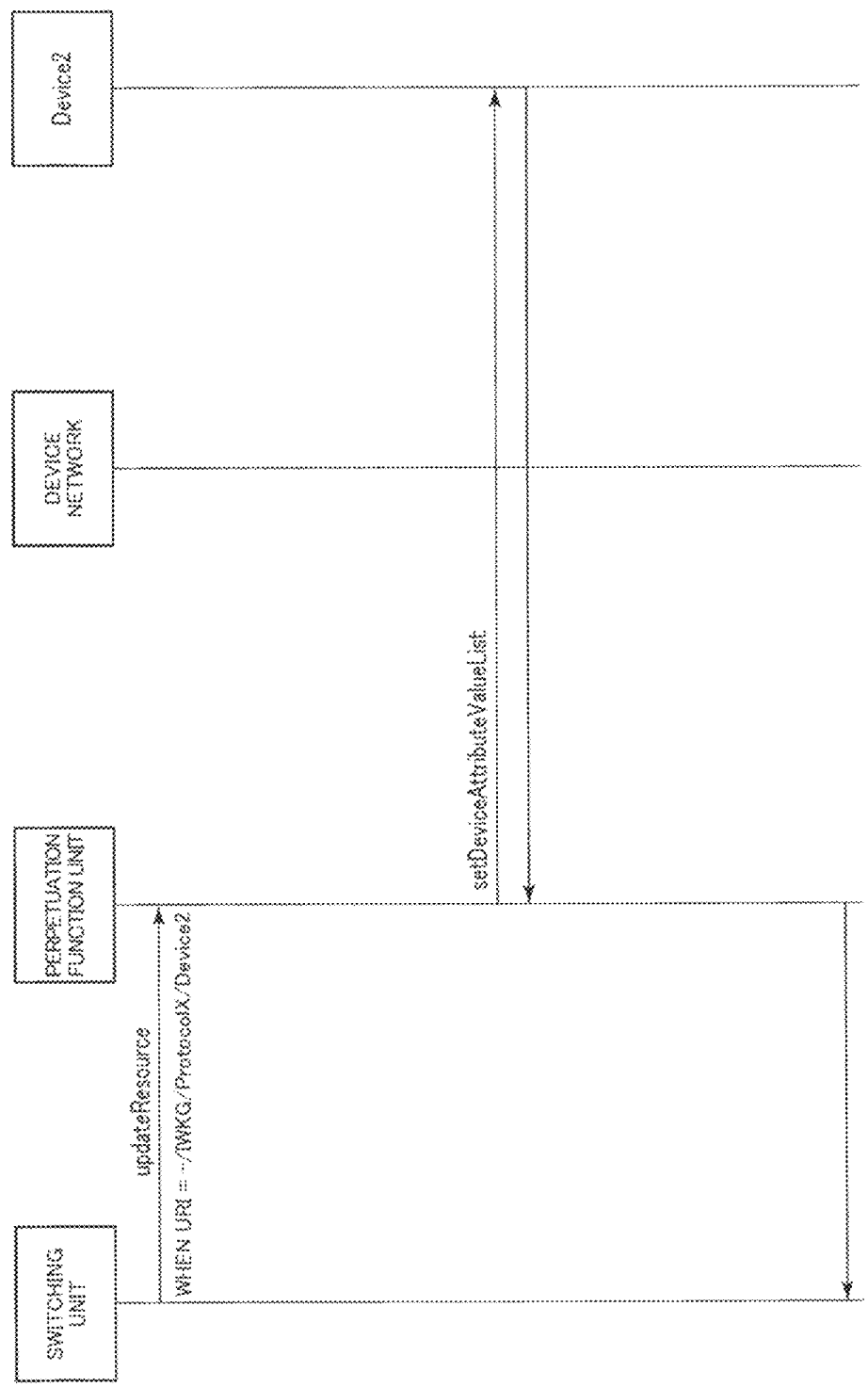
FIG. 15 is a diagram showing an example of a processing operation performed when updateResource( ) of the perpetuation function unit is invoked.

FIG. 15 is a diagram showing an example of a processing operation performed when updateResource( ) of a perpetuation function unit is invoked.

Next, a description will be given of processing performed when updateResource( ) of the perpetuation function unit 23b3 is invoked as "URI=-/IWKG/ProtocolX/Device2". In a physical meaning, this corresponds to an attribute value of a device (hereinafter referred to as "Device2" with a device name: "Device2" being updated. Here, a description will be given of an example where the Device2 is a music player.

It is assumed that [playingMusic, Volume] and ["Thriller", 15] have been designated, respectively, as attributeNameList that is related to an attribute name to be updated and attributeValueList that is related to an attribute value to be updated, by the perpetuation function unit 23b3.

In this case, the perpetuation function unit 23b3 designates the Device2 as a device, and invokes: setDeviceAttributeValue (Device2, attributeNames, attributeValueList);.

With the above configuration, the application shown in FIG. 12 can access a non-oneM2M device. This solves the problem that has been described with reference to FIG. 11.

Figure 16:
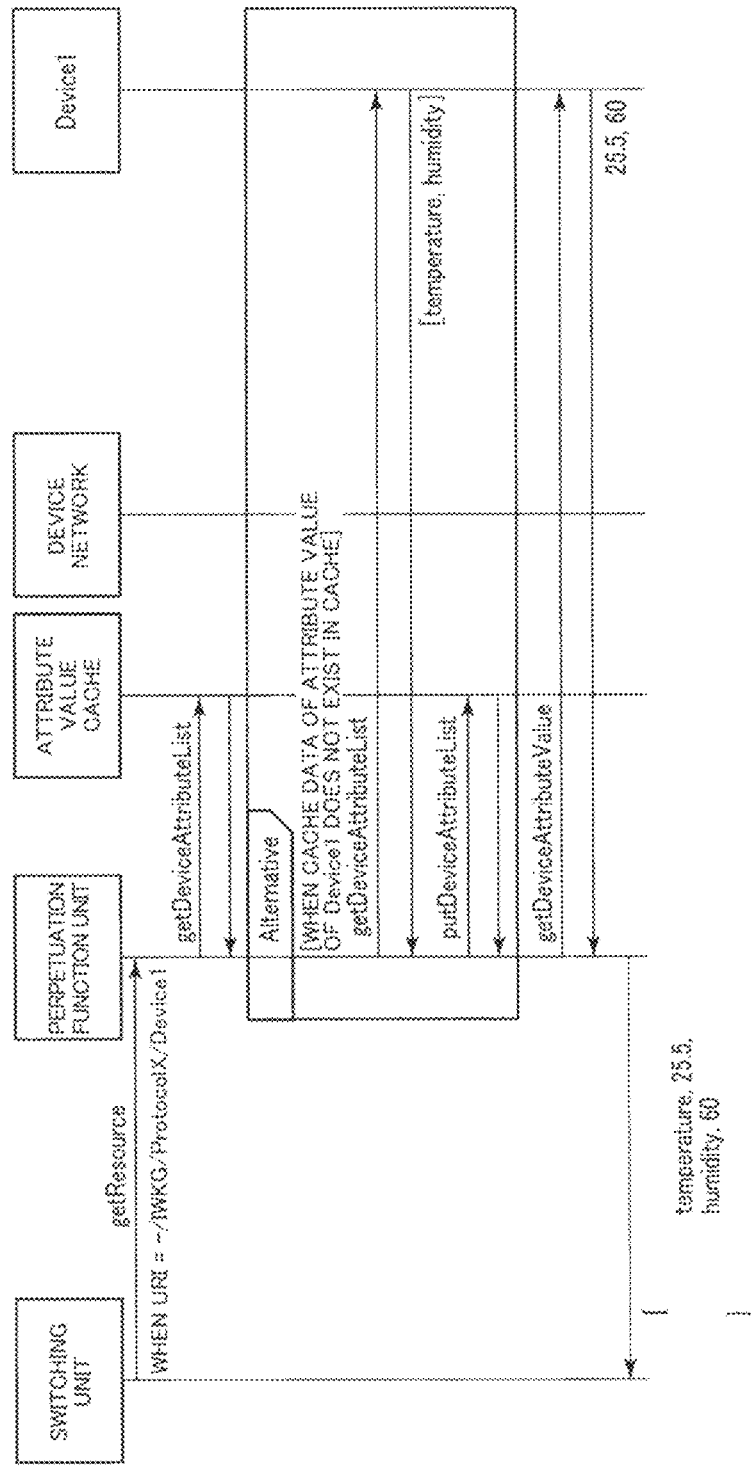
FIG. 16 is a diagram showing an example of a processing operation performed when getResource( ) of the perpetuation function unit is invoked and an attribute name cache exists.

FIG. 16 is a diagram showing an example of a processing operation performed when getResource( ) of a perpetuation function unit is invoked and an attribute name cache exists.

The example shown in FIG. 16 is an extension of the example shown in FIG. 14, and aims to increase the efficiency in acquisition of an attribute name by disposing, in the perpetuation function unit 23*b*3, the attribute name cache, which is commonly provided in a device.

For example, the attribute name cache has I/Fs such as (31) and (32) below.
  (31) String [ ] getDeviceAttributeList(Device d); //Acquire an attribute name that a designated device has.
  (32) putDeviceAttributeList (Device d, String [ ] attributeName); // Register the attribute name that the designated device has.

As shown in FIG. 16, before making an inquiry about the attribute name to the Device1, the perpetuation function unit 23*b*3 makes an inquiry about the attribute name of the Device1 to the attribute name cache using getDeviceAttributeList( ). If cache data of the attribute name of the Device1 exists in the attribute name cache, the perpetuation function unit 23*b*3 acquires this attribute name.

If cache data of the attribute name of the Device1 does not exists in the attribute name cache, the perpetuation function unit 23*b*3 makes an inquiry about the attribute name to the Device1 using getDeviceAttributeList( ), similarly to the example shown in FIG. 14.

At this time, to efficiently acquire the attribute name data later, the perpetuation function unit 23*b*3 registers the data of the attribute name acquired from the Device1 to the attribute name cache, using putDeviceAttributeList( ).

Figure 17:
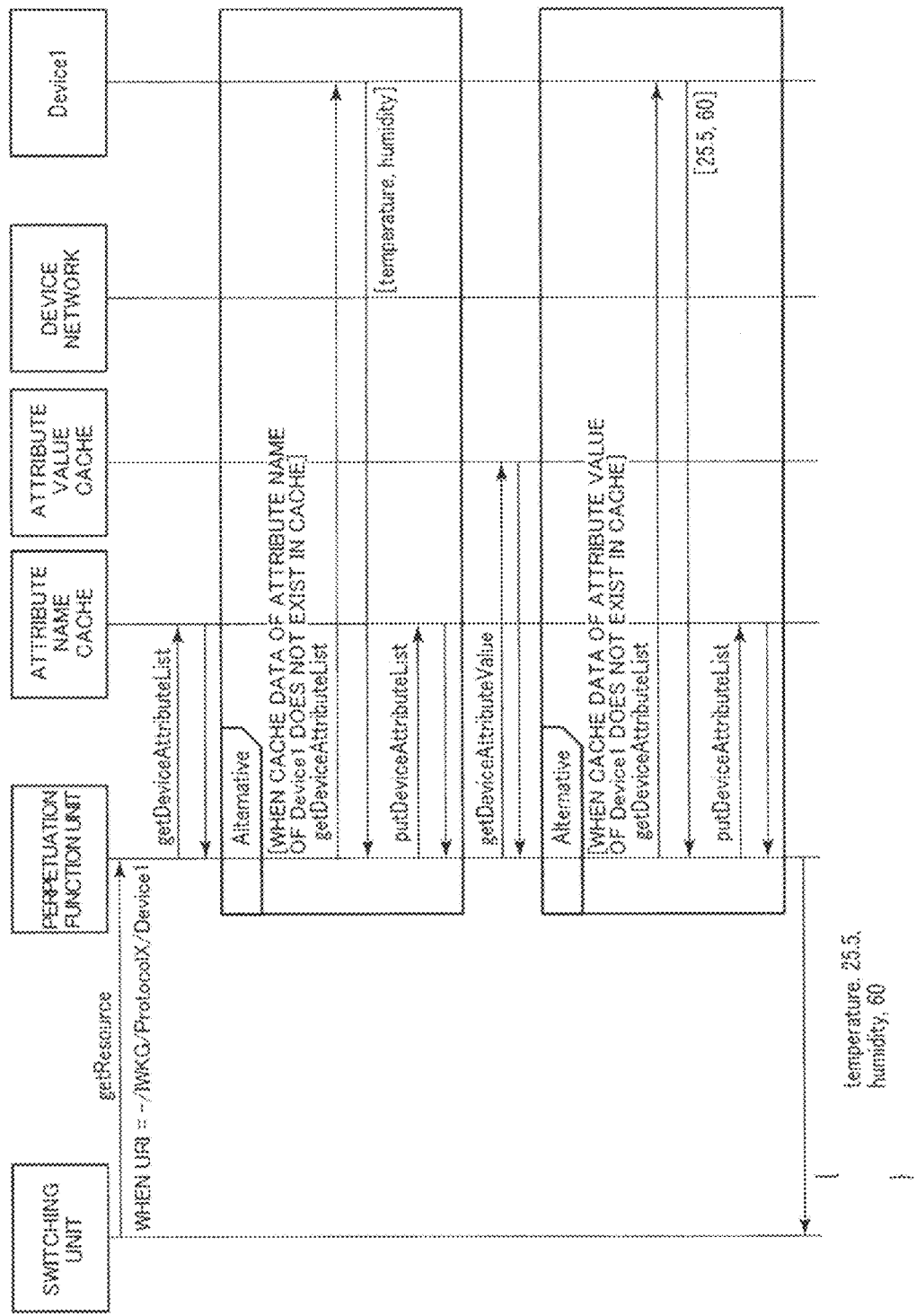
FIG. 17 is a diagram showing a first example of a processing operation performed when getResource( ) of the perpetuation function unit is invoked and the attribute name cache and an attribute value cache exist.

FIG. 17 is a diagram showing a first example of a processing operation performed when getResource( ) of a perpetuation function unit is invoked and when the attribute name cache and an attribute value cache exist.

There are device networks in which a notification can be received when an attribute value is updated and in which such a notification cannot be received.

A description will be given below of an implementation example in a device network in which such a notification cannot be received.

This implementation example aims to increase the efficiency of receiving a notification when an attribute value is updated, by disposing, in the perpetuation function unit 23*b*3, the attribute value cache, which is commonly provided in a device, as shown in FIG. 17.

For example, the attribute value cache has I/Fs such as (41) and (42) below, for example.
(41)
  Object [ ] getDeviceAttributeValue (Device d, String [ ] attributeNames); // Acquire an attribute name that a designated device has.
(42)
  putDeviceAttributeValue (Device d, String [ ] attributeName, Object [ ] values); // Register the attribute name of the designated device.

As shown in FIG. 17, before making an inquiry about the attribute value to the Device1, the perpetuation function unit 23*b*3 makes an inquiry about the attribute value of the Device1 to the attribute value cache using getDeviceAttributeValue( ). If cache data of the attribute value of the Device1 exists in this attribute value cache, the perpetuation function unit 23*b*3 acquires this attribute value.

If cache data of the attribute value of the Device1 does not exist in the attribute value cache, the perpetuation function unit 23*b*3 makes an inquiry about the attribute value to the Device1 using getDeviceAttributeValue( ), similarly to the example shown in FIG. 14.

At this time, to efficiently acquire the attribute value data later, the perpetuation function unit 23*b*3 registers the data of the attribute value acquired from the Device1 to the attribute value cache, using putDeviceAttributeValue( ).

The aforementioned attribute value cache can manage the validity of the cache. In the simplest example, duration (e.g. 100 msec) that is given as a parameter of the system is stored in the attribute value cache, and corresponding cache data is discarded from the attribute value cache when a time designated by the duration has passed since the time when the aforementioned putDeviceAttributeValue( ) is invoked.

Next, cache validity control will be described.

Other examples of cache validity management may include cache validity control in which effective time of the cache is dynamically determined and controlled using at least one of data update time and data modification time. The data update time refers to the time when data was updated. However, the data itself may not be modified. Data having been updated although the data value is the same can be detected by a device or the like that has a function of returning both the update time and a version number.

On the other hand, a device that does not have such a function can make a determination based on the fact that a data value that has been acquired last time differs from a data value that was acquired next time.

As a specific example, firstly, the perpetuation function unit 23*b*3 has a device monitoring phase independently of a request from the switching unit 23*a*, and monitors data update time and data modification time during the period of the device monitoring phase.

During this period, the perpetuation function unit 23*b*3 accesses the device with slightly high frequency, and acquires the data update time and the data modification time. The perpetuation function unit 23*b*3 calculates a difference in the data update time and a difference in the data modification time, and obtains a data update interval and a data modification interval based on the calculated differences. The perpetuation function unit 23*b*3 determines the aforementioned duration with respect to the tendency of these intervals.

As a first method, the perpetuation function unit 23*b*3 sets the smallest value of the data update interval as the duration.

As a second method, the perpetuation function unit 23*b*3 sets the smallest value of the data modification interval as the duration.

As a third method, the perpetuation function unit 23*b*3 performs statistical calculation on the data update interval, obtains an average $\mu$ and a standard deviation of the data update interval, and employs $\mu - n \cdot \sigma$ as the duration. Here, for example, 1, 2, and 3 are assigned to n.

As a fourth method, the perpetuation function unit 23*b*3 performs statistical calculation on the data modification interval, obtains an average $\mu$ and a standard deviation $\sigma$ of the data modification interval, and employs $\mu - n \cdot \sigma$ as the duration. Here, for example, 1, 2, and 3 are assigned to n.

Thus, the cache lifetime corresponding to the substantial data modification interval and data update interval can be acquired.

A change in the tendency can be followed by carrying out such a monitoring phase not only when the system is started but regularly.

Figure 18:
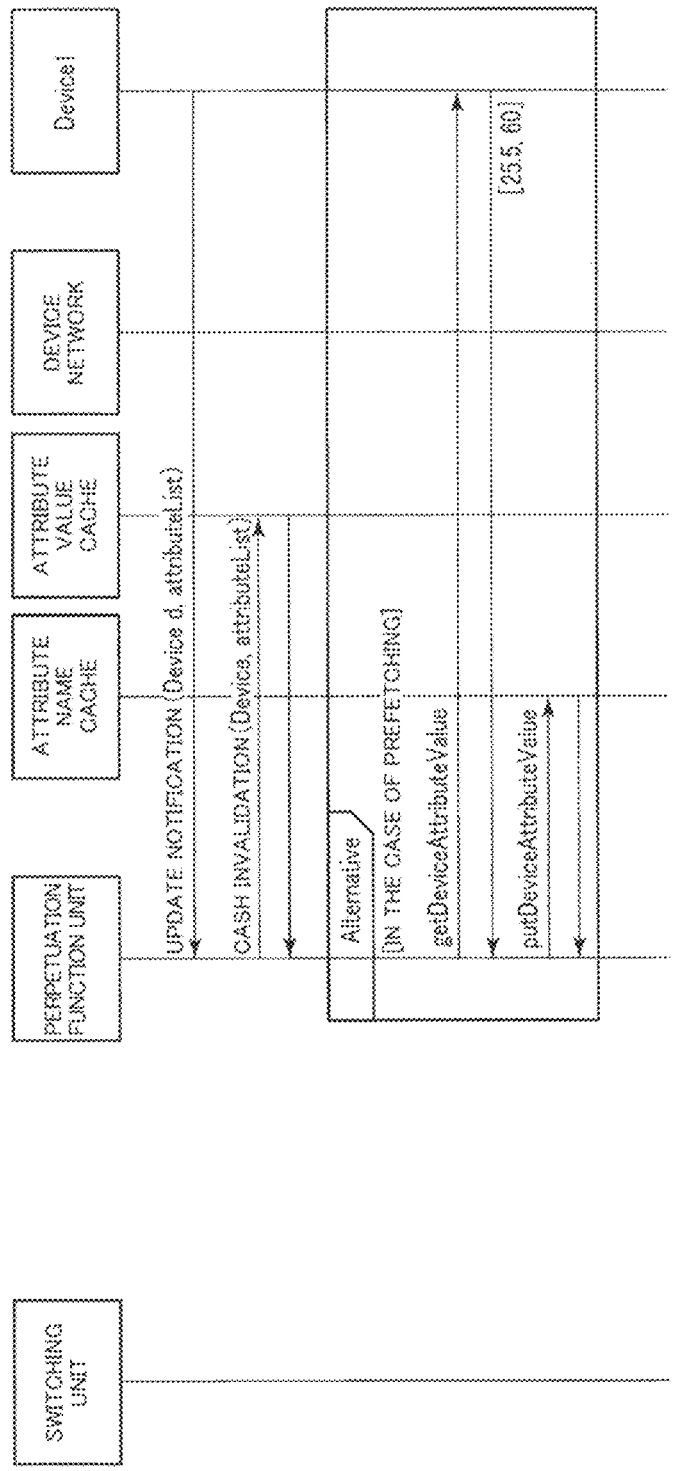
FIG. 18 is a diagram showing a second example of a processing operation performed when getResource( ) of the perpetuation function unit is invoked and the attribute name cache and the attribute value cache exist.

Next, a description will be given of a method of managing the attribute value cache in a device network in which a notification can be received. FIG. 18 is a diagram showing a second example of a processing operation performed when getResource( ) of a perpetuation function unit is invoked and when the attribute name cache and the attribute value cache exist.

In the example shown in FIG. 18, when the Device1 updates the attribute value, the perpetuation function unit 23b3 receives a notification of this update. Here, a device ID and an attribute name that has been changed are delivered as parameters to the perpetuation function unit 23b3. Thereafter, the perpetuation function unit 23b3 invalidates the data of the attribute value of the Device1 stored in the attribute value cache, in accordance with the designated parameters.

After the invalidation, processing branches depending on whether or not to prefetch a new attribute. In the case of prefetching a new attribute, the perpetuation function unit 23b3 acquires data of the changed attribute value from the Device1 using getDeviceAttributeValue( ), and stores the data of this attribute value in the attribute value cache using putDeviceAttributeValue( ).

In the case of not prefetching a new attribute, the perpetuation function unit 23b3 does not particularly perform processing and waits for the next notification.

Note that the present invention is not limited to the above embodiments, and may be modified in various manners without departing from the gist of the invention at the implementation stage. The embodiments may be combined as appropriate as much as possible, and in this case, combined effects can be achieved. Furthermore, the embodiments include the invention at various stages, and various inventions may be extracted by appropriately combining a plurality of disclosed constituent elements.

The methods described in the embodiments can be stored as programs (software means) that can be executed by a computer, in a recording medium such as a magnetic disk (Floppy (registered trademark) disk, hard disk etc.), an optical disk (CD-ROM, DVD, MO etc.), and a semiconductor memory (ROM, RAM, flash memory etc.), or can also be transferred and distributed by means of a communication medium. Note that the programs stored in a medium may include a configuration program for configuring, in the computer, software means (including not only an execution program, but also a table and a data structure) that is to be executed by the computer. The computer that realizes the present apparatus loads the programs stored in the recording medium, configures the software means using the configuration program depending on the case, and performs the above-described processing due to operations being controlled by the software means. Note that the "recording medium" mentioned in the present specification is not limited to one for distribution, but may also include a recording medium such as a magnetic disk, a semiconductor memory, or the like that is provided in a device connected in the computer or connected thereto via a network.

REFERENCE SIGNS LIST 10, 110 Node
20, 120 CSE
21, 121 Request accepting unit
22, 122 Resource processing unit
22a, 122a First container
22b, 122b Second container
23 Perpetuation processing unit
23a Switching unit
23b1 First perpetuation function unit
23b2 Second perpetuation function unit
23b3 Third perpetuation function unit
40, 41 Network interface unit
300, 301 Device

The invention claimed is:

1. A data processing system in which one or more application programs and one or more devices are connected to a database via a network, the system comprising:
one or more processors; and
memory including instructions that, when executed by the one or more processors, perform to:
perform acceptance processing for accepting a request from the application programs or data from the devices;
have a plurality of types of perpetuation functions of performing processing in accordance with a type of the request or the data and an identifier of a resource and perpetually storing a processing result in the database, perform, using the perpetuation functions, processing corresponding to the type of the request or the data and the identifier of the resource accepted through the acceptance processing, and perform perpetuation processing for perpetually storing the processing result in the database; and
switch a destination at which the request or the data accepted through the acceptance processing is processed to one of the plurality of types of perpetuation functions, based on a setting file which is a file corresponding to the type of the request or the data and the identifier of the resource accepted through the acceptance processing and in which one of the plurality of types of perpetuation functions is set as the destination of the request or the data,
wherein the switching includes (a) loading the setting file, (b) if a uniform resource identifier (URI) and a resource type of the request match one of the rules registered in the setting file, specifying a perpetuation function corresponding to a name written with a driver tag in the matched one of the rules, (c) if a class of driver corresponding to the specified perpetuation function is uninstantiated, instantiating the class and invoking the driver of the matched one of the rules, and (d) if the class of the driver corresponding to the specified perpetuation function is instantiated, invoking the driver for the matched one of the rules;
wherein the instructions, when executed by the one or more processors, further perform to:
accept the data from the devices during the acceptance processing;
wherein the data from the devices includes a group of physical data;
wherein the group of physical data includes a plurality of pieces of logical data;
the plurality of pieces of logical data are flagged to indicate that the logical data is included in the group of physical data; and
separate the group of physical data into separate pieces of logical data, and store the separated pieces of the physical data as the processing result in the database, during the perpetuation processing.

2. The data processing system according to claim 1, wherein the instructions, when executed by the one or more processors, further perform to store, in the database, the data that has been accepted through the acceptance processing and assigned a serial number, and the separated pieces of the physical data that are assigned the same serial number as a serial number assigned to the data before being separated, during the perpetuation processing.

3. The data processing system according to claim 1, wherein the instructions, when executed by the one or more processors further perform to:
accept the data from the devices during the acceptance processing; and
when the data accepted through the acceptance processing includes a plurality of types of data that are associated with each other, separate the plurality of types of data by type, and store the separated types of data in the database, during the perpetuation processing.

4. The data processing system according to claim 1, wherein the instructions, when executed by the one or more processors, further perform to read out the data stored in the database and sets the read data as data that can be accessed by the application program, during the perpetuation processing.

5. The data processing system according to claim 4, wherein the instructions, when executed by the one or more processors, further perform to: read out the data stored in the database, set first data in the read data as data that can be accessed by a first application program, and set second data in the read data as data that can be accessed by a second application program, during the perpetuation processing.

6. The data processing system according to claim 1, wherein the instructions, when executed by the one or more processors, further perform to:
communicate with a second device different from the device via a network interface, during the perpetuation processing; and
transmit and receive information to and from the second device using a second protocol other than a first communication protocol, based on the request accepted conforming to the first communication protocol through the acceptance processing.

7. The data processing system according to claim 6, further comprising a storage device for storing information acquired from the second device through the perpetuation processing,
wherein the instructions, when executed by the one or more processors, further perform to:
store the information acquired from the second device in the storage device based on a request to acquire information from the second device, the request having been accepted conforming to the first communication protocol through the acceptance processing; and
when information to be acquired indicated by the request is stored in the storage device, read out the information from the storage device, based on the request accepted conforming to the first communication protocol through the acceptance processing.

8. The data processing system according to claim 1, wherein the database is composed of two or more databases physically or logically different from one another.

9. A data processing method performed by a data processing system in which one or more application programs and one or more devices are connected to a database via a network, the system including one or more processors, the method comprising:
by the one or more processors, accepting a request from the application programs or data from the devices;
by the one or more processors, switching a destination at which the accepted request or data and an identifier of a resource is processed to one of a plurality of types of perpetuation functions of performing processing based on a setting file which is a file corresponding to a type of the request or the data and the identifier of the resource and perpetually storing a processing result in the database, based on the type of the accepted request or data and the identifier of the resource and in which one of the plurality of types of perpetuation functions is set as the destination of the request or the data,
wherein the switching includes (a) loading the setting file, (b) if a uniform resource identifier (URI) and a resource type of the request match one of the rules registered in the setting file, specifying a perpetuation function corresponding to a name written with a driver tag in the matched one of the rules, (c) if a class of driver corresponding to the specified perpetuation function is uninstantiated, instantiating the class and invoking the driver of the matched one of the rules, and (d) if the class of the driver corresponding to the specified perpetuation function is instantiated, invoking the driver for the matched one of the rules; and
by the one or more processors, performing processing in accordance with the type of the request or the data and the identifier of the resource using the perpetuation function to which the destination has been switched, and perpetually storing a processing result in the database;
by the one or more processors, accepting the data from the devices during the acceptance processing;
wherein the data from the devices includes a group of physical data;
wherein the group of physical data includes a plurality of pieces of logical data;
the plurality of pieces of logical data are flagged to indicate that the logical data is included in the group of physical data; and
by the one or more processors, separating the group of physical data into separate pieces of logical data, and store the separated pieces of the physical data as the processing result in the database, during the perpetuation processing.

10. A non transitory computer readable storage medium storing a data processing program for causing the one or more processors to: perform acceptance processing for accepting a request from the application programs or data from the devices; have a plurality of types of perpetuation functions of performing processing in accordance with a type of the request or the data and an identifier of a resource and perpetually storing a processing result in the database, perform, using the perpetuation functions, processing corresponding to the type of the request or the data and the identifier of the resource accepted through the acceptance processing, and perform perpetuation processing for perpetually storing the processing result in the database; and switch a destination at which the request or the data accepted through the acceptance processing is processed to one of the plurality of types of perpetuation functions, based on a setting file which is a file corresponding to the type of the request or the data and the identifier of the resource accepted through the acceptance processing and in which one of the plurality of types of perpetuation functions is set as the destination of the request or the data, wherein the switching includes (a) loading the setting file, (b) if a uniform resource identifier (URI) and a resource type of the request match one of the rules registered in the setting file, specifying a perpetuation function corresponding to a name written with a driver tag in the matched one of the rules, (c) if a class of driver corresponding to the specified perpetuation function is uninstantiated, instantiating the class and invoking the driver of the matched one of the rules, and (d) if the class of the driver corresponding to the specified perpetuation function is instantiated, invoking the driver for the matched one of the rules; wherein the instructions, when executed by the one or more processors, further perform to: accept the data from the devices during the acceptance processing; wherein the data from the devices includes a group of physical data; wherein the group of physical data includes a plurality of pieces of logical data; the plurality of pieces of logical data are flagged to indicate that the logical data is included in the group of physical data; and separate the group of physical data into separate pieces of logical data, and store the separated pieces of the physical data as the processing result in the database, during the perpetuation processing.

\* \* \* \* \*